United States Patent
Anand et al.

(10) Patent No.: US 12,249,023 B2
(45) Date of Patent: Mar. 11, 2025

(54) INTERPRETABLE TASK-SPECIFIC DIMENSIONALITY REDUCTION

(71) Applicant: GE Precision Healthcare LLC, Wauwatosa, WI (US)

(72) Inventors: Deepa Anand, Bangalore (IN); Bipul Das, Bengaluru (IN); Vanika Singhal, Bangalore (IN); Rakesh Mullick, Bangalore (IN); Sanjay Kumar NT, Hyderabad (IN)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 181 days.

(21) Appl. No.: 18/065,964

(22) Filed: Dec. 14, 2022

(65) Prior Publication Data
US 2024/0203039 A1 Jun. 20, 2024

(51) Int. Cl.
*G06T 15/20* (2011.01)
*G06T 15/08* (2011.01)
*G06V 10/82* (2022.01)

(52) U.S. Cl.
CPC .............. *G06T 15/20* (2013.01); *G06T 15/08* (2013.01); *G06V 10/82* (2022.01)

(58) Field of Classification Search
None
See application file for complete search history.

(56) References Cited

U.S. PATENT DOCUMENTS

| | | | |
|---|---|---|---|
| 2019/0130562 A1* | 5/2019 | Liu | G06T 7/0012 |
| 2019/0371450 A1* | 12/2019 | Lou | G16H 50/30 |
| 2024/0104392 A1* | 3/2024 | Ye | G06V 10/778 |

OTHER PUBLICATIONS

Isensee, Fabian, et al. "nnu-net: Self-adapting framework for u-net-based medical image segmentation." arXiv preprint arXiv: 1809. 10486 (2018). (Year: 2018).*

Zeegers, Mathé T., et al. "Task-driven learned hyperspectral data reduction using end-to-end supervised deep learning." Journal of Imaging 6.12 (2020): 132. (Year: 2020).*

(Continued)

*Primary Examiner* — Ryan M Gray
(74) *Attorney, Agent, or Firm* — Amin, Turocy & Watson, LLP

(57) ABSTRACT

Systems/techniques that facilitate interpretable task-specific dimensionality-reduction are provided. In various embodiments, a system can access a three-dimensional medical image. In various aspects, the system can generate, via execution of a first deep learning neural network, a voxel-wise weight map corresponding to the three-dimensional medical image and a set of projection vectors corresponding to the three-dimensional medical image. In various instances, the system can generate a set of two-dimensional projection images of the three-dimensional medical image, based on the voxel-wise weight map and the set of projection vectors. In various cases, the first deep learning neural network can be trained in a serial pipeline with a second deep learning neural network that is configured to perform an inferencing task on two-dimensional inputs. This can cause the set of two-dimensional projection images to be tailored to the inferencing task.

20 Claims, 15 Drawing Sheets

(56) References Cited

OTHER PUBLICATIONS

Yang, Zhengshi, et al. "Performing sparse regularization and dimension reduction simultaneously in multimodal data fusion." Frontiers in neuroscience 13 (2019): 642. (Year: 2019).*

Li, Mingchao, et al. "Image projection network: 3D to 2D image segmentation in OCTA images." IEEE Transactions on Medical Imaging 39.11 (2020): 3343-3354. (Year: 2020).*

Li, M. et al. | "Image Projection Network: 3D to 2D Image Segmentation in OCTA Images." IEEE Transactions on Medical Imaging (vol. 39, Issue: 11, May 2020), 12 pages.

Indraswari, R. et al. | "Multi-projection deep learning network for segmentation of 3D medical images." Pattern Recognition Letters, vol. 125, Jul. 1, 2019, pp. 791-797, https://doi.org/10.1016/j.patrec.2019.08.003, 7 pages.

* cited by examiner

US 12,249,023 B2

INTERPRETABLE TASK-SPECIFIC DIMENSIONALITY REDUCTION

TECHNICAL FIELD

The subject disclosure relates generally to dimensionality reduction, and more specifically to interpretable task-specific dimensionality reduction.

BACKGROUND

Medical images are often captured, generated, or reconstructed as three-dimensional voxel arrays. Performing a deep learning inferencing task on a three-dimensional voxel array can consume excessive computing resources. To reduce such overconsumption of computing resources, the deep learning inferencing task can instead be performed on one or more dimensionally-reduced representations of the three-dimensional voxel array. Some existing techniques generate such dimensionally-reduced representations analytically. Although such techniques can yield easily interpretable or understandable dimensionally-reduced representations, such techniques can lose or obscure voxel content that is dispositive with respect to the deep learning inferencing task at issue. Other existing techniques generate such dimensionally-reduced representations via deep learning. Although such techniques can be trained to output dimensionally-reduced representations that have not lost task-dispositive voxel content or do not contain obscured versions of task-dispositive voxel content, the dimensionally-reduced representations produced by such techniques are not easily interpretable or understandable.

Systems or techniques that can facilitate dimensionality-reduction in an interpretable fashion and without losing task-dispositive substantive content can be considered as desirable.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus or computer program products that facilitate interpretable task-specific dimensionality reduction are described.

According to one or more embodiments, a system is provided. The system can comprise a non-transitory computer-readable memory that can store computer-executable components. The system can further comprise a processor that can be operably coupled to the non-transitory computer-readable memory and that can execute the computer-executable components stored in the non-transitory computer-readable memory. In various embodiments, the computer-executable components can comprise an access component that can access a three-dimensional medical image. In various aspects, the computer-executable components can comprise a parameter component that can generate, via execution of a first deep learning neural network, a voxel-wise weight map corresponding to the three-dimensional medical image and a set of projection vectors corresponding to the three-dimensional medical image. In various instances, the computer-executable components can comprise a projection component that can generate a set of two-dimensional projection images of the three-dimensional medical image, based on the voxel-wise weight map and the set of projection vectors. In various cases, the first deep learning neural network can be trained in a serial pipeline with a second deep learning neural network that is configured to perform an inferencing task on two-dimensional inputs, such that the set of two-dimensional projection images can be considered as tailored to the inferencing task.

According to one or more embodiments, a computer-implemented method is provided. In various embodiments, the computer-implemented method can comprise accessing, by a device operatively coupled to a processor, a three-dimensional medical image. In various aspects, the computer-implemented method can comprise generating, by the device and via execution of a first deep learning neural network, a voxel-wise weight map corresponding to the three-dimensional medical image and a set of projection vectors corresponding to the three-dimensional medical image. In various instances, the computer-implemented method can comprise generating, by the device, a set of two-dimensional projection images of the three-dimensional medical image, based on the voxel-wise weight map and the set of projection vectors. In various cases, the first deep learning neural network can be trained in a serial pipeline with a second deep learning neural network that is configured to perform an inferencing task on two-dimensional inputs, such that the set of two-dimensional projection images can be considered as tailored to the inferencing task.

According to one or more embodiments, a computer program product for facilitating interpretable task-specific dimensionality reduction is provided. In various embodiments, the computer program product can comprise a non-transitory computer-readable memory having program instructions embodied therewith. In various aspects, the program instructions can be executable by a processor to cause the processor to access a voxel array. In various instances, the program instructions can be further executable to cause the processor to execute a first deep learning neural network on the voxel array, thereby yielding a voxel-wise weight map and at least one projection vector. In various cases, the program instructions can be further executable to cause the processor to multiply, in element-wise fashion, the voxel array by the voxel-wise weight map, thereby yielding an altered voxel array. In various aspects, the program instructions can be further executable to cause the processor to project the altered voxel array along the at least one projection vector, thereby yielding at least one projected pixel array. In various instances, the program instructions can be further executable to cause the processor to render the at least one projected pixel array on an electronic display. In various cases, the first deep learning neural network can be trained in a serial pipeline with a second deep learning neural network that is configured to perform an inferencing task on two-dimensional inputs, such that the at least one projected pixel array is specific to the inferencing task.

DETAILED DESCRIPTION

Figure 1:
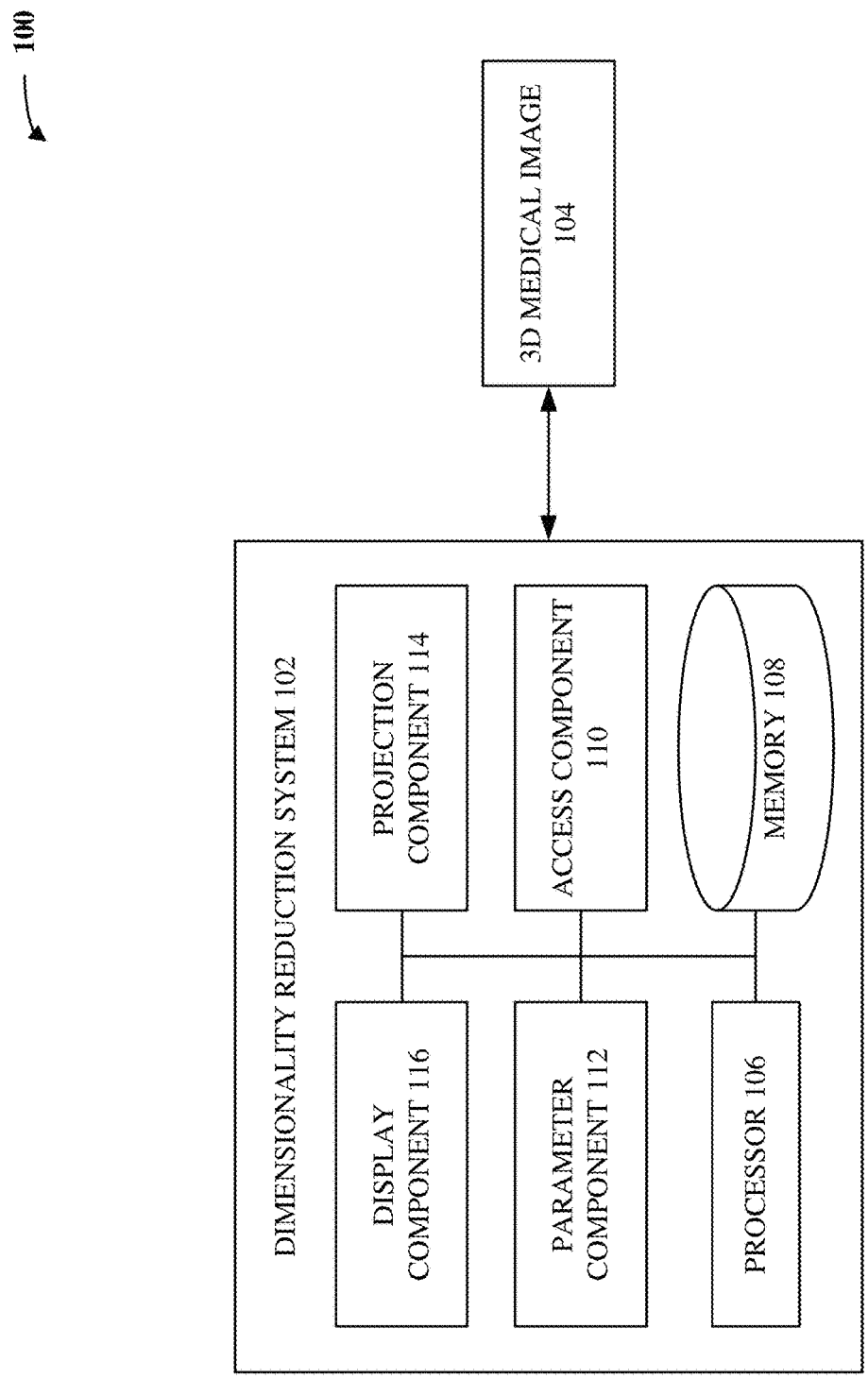
FIG. 1 illustrates a block diagram of an example, non-limiting system that facilitates interpretable task-specific dimensionality reduction in accordance with one or more embodiments described herein.

The following detailed description is merely illustrative and is not intended to limit embodiments or application/uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A medical image can depict any suitable anatomical structures (e.g., head, chest, lungs, heart, brain, colon, bones, blood vessels) of a medical patient. In various aspects, the medical image can be captured, generated, reconstructed, or otherwise formatted (e.g., by a computed tomography (CT) scanner, a magnetic resonance imaging (MRI) scanner, an X-ray scanner, a positron emission tomography (PET) scanner, or an ultrasound scanner) as a three-dimensional voxel array (e.g., as a three-dimensional array of Hounsfield unit values). In various instances, it can be desired to perform an inferencing task (e.g., symptom classification, orientation determination, landmark extraction, display field of view determination) with respect to the anatomical structures depicted in such three-dimensional voxel array. In various cases, a deep learning neural network can be trained (e.g., via supervised training, unsupervised training, or reinforcement learning) to perform such inferencing task.

When the deep learning neural network is trained or otherwise configured to perform the inferencing task directly on the three-dimensional voxel array, computing resources (e.g., inferencing time, computer memory, computer processing capacity) can be excessively consumed. Indeed, a neural network that is configured to operate on three-dimensional inputs can be significantly deeper (e.g., have significantly more layers or neurons) as compared to a neural network that is instead configured to operate on two-dimensional or one-dimensional inputs. Such increased depth can commensurately increase the amount of computer memory and processing capacity needed to electronically store and deploy the neural network. Such increased depth can also commensurately increase the amount of time needed for the neural network to produce an inferencing task result when executed.

To reduce such overconsumption of computing resources, the deep learning neural network can instead be configured to perform the inferencing task on one or more dimensionally-reduced representations of the three-dimensional voxel array.

Some existing techniques generate such dimensionally-reduced representations analytically. Various examples of such analytical techniques can include principal component analysis (PCA), maximum intensity projection rendering (MaxIP), or mean intensity projection rendering (MIP). When applied to the three-dimensional voxel array, such analytical techniques can yield a two-dimensional projection of the three-dimensional voxel array. Note that such two-dimensional projection can be considered as a dimensionally-reduced representation of the three-dimensional voxel array that is easily interpretable or easily understandable to a medical professional or technician. After all, the two-dimensional projection can be considered as visually illustrating the same anatomical structures as the three-dimensional voxel array, albeit with one fewer spatial dimension.

Unfortunately, however, such existing techniques can lose or obscure voxel content that is dispositive or otherwise pertinent to the deep learning inferencing task at issue. For instance, suppose that the deep learning inferencing task is aneurysm classification. In such case, PCA, MaxIP, or MIP can be implemented to create a two-dimensional x-y plane projection of the three-dimensional voxel array, a two-dimensional x-z plane projection of the three-dimensional voxel array, and a two-dimensional y-z plane projection of the three-dimensional voxel array, and the deep learning neural network can be configured to receive such two-dimensional projections as input and to produce as output a classification label indicating whether or not the medical patient exhibits an aneurysm. Regrettably, it can be possible that whatever substantive content of the three-dimensional voxel array that best depicts the presence or absence of an aneurysm is fully or partially hidden when viewed from such projected perspectives. In other words, it can be possible that such substantive voxel content is not depicted clearly or at all in the two-dimensional x-y plane projection, in the two-dimensional x-z plane projection, and in the two-dimensional y-z plane projection. Accordingly, in such case, aneurysm classification cannot be reliably performed on such dimensionally-reduced representations of the three-dimensional voxel array. As this example helps to illustrate, analytical dimensionality-reduction techniques do not take into account the particular deep learning inferencing task that is desired to be performed, and thus such techniques can hide, obscure, or otherwise lose voxel content that is needed to properly perform the deep learning inferencing task.

Other existing techniques generate dimensionally-reduced representations via deep learning. For example, such existing techniques can involve encoder-decoder architectures, in which a deep learning encoder is trained to compress three-dimensional voxel arrays into latent vectors (e.g., which themselves might be one-dimensional, two-dimensional, or three-dimensional) and in which a deep learning decoder is trained to decompress latent vectors back into three-dimensional voxel arrays. In such case, the deep learning encoder can, once trained, receive as input the three-dimensional voxel array and can produce as output a latent vector representing the three-dimensional voxel array. Because the deep learning encoder can have been trained in conjunction with the deep learning decoder, the latent vector can be considered as containing all of the substantive content of the three-dimensional voxel array, despite being dimensionally-reduced. In other words, the latent vector can be considered as not having hidden, obscured, or lost substantive voxel content that is dispositive or otherwise pertinent with respect to the deep learning inferencing task at issue.

Unfortunately, however, such existing techniques produce dimensionally-reduced representations that are not easily visually interpreted or understood by a medical professional or technician. After all, the latent vector representing the three-dimensional voxel array does not visually depict or illustrate the anatomical structures of the medical patient. Instead, the latent vector can be considered as a collection of scalar values that possess no readily interpretable or understandable physical meaning with respect to the anatomical structures of the medical patient (e.g., the latent vector can be considered as a black-box output).

Accordingly, systems or techniques that can facilitate dimensionality-reduction in an interpretable fashion and without losing task-dispositive substantive content can be considered as desirable.

Various embodiments described herein can address one or more of these technical problems. One or more embodiments described herein can include systems, computer-implemented methods, apparatus, or computer program products that can facilitate interpretable task-specific dimensionality reduction. In other words, the inventors of various embodiments described herein devised various dimensionality-reduction techniques that can exhibit the interpretability offered by analytical dimensionality-reduction while also exhibiting the robustness against substantive content loss/obscurity offered by deep learning dimensionality-reduction. In still other words, the present inventors devised how to perform deep learning dimensionality-reduction with heightened explainability.

In particular, the present inventors recognized that existing techniques for facilitating dimensionality-reduction via deep learning lack interpretability at least in part because such existing techniques train a deep learning neural network (e.g., the deep learning encoder mentioned above) to directly generate a dimensionally-reduced representation of a three-dimensional voxel array. Accordingly, the present inventors realized that such lack of interpretability can be ameliorated by training a deep learning neural network to instead indirectly generate a dimensionally-reduced representation of the three-dimensional voxel array.

More specifically, when given a three-dimensional voxel array that is desired to be compressed into an interpretable dimensionally-reduced format, a deep learning neural network can, as described herein, be configured to receive the given three-dimensional voxel array as input and to produce as output a weight map and a projection vector. In various aspects, the numerical elements of the weight map can respectively correspond (e.g., in one-to-one fashion) to the voxels of the three-dimensional voxel array. That is, the weight map can include one distinct scalar weight for each distinct voxel of the three-dimensional voxel array. Moreover, in various instances, the projection vector can define or otherwise indicate a direction in three-space (e.g., a direction within whatever coordinate system is applied to the three-dimensional voxel array). Accordingly, in various cases, the three-dimensional voxel array can be multiplied, in element-wise fashion, with the weight map, thereby yielding an altered three-dimensional voxel array, and the altered three-dimensional voxel array can be projected (e.g., via MaxIP or MIP) along the direction indicated by the projection vector, thereby yielding a two-dimensional projection image.

Note that such two-dimensional projection image can, as described herein, be considered as a dimensionally-reduced representation of the three-dimensional voxel array that is easily visually interpretable to a medical professional or technician. In particular, because the two-dimensional projection image can be obtained via a projection technique (e.g., MaxIP or MIP), the two-dimensional projection image can be considered as a pixel array that visually illustrates the same anatomical structures shown in the three-dimensional voxel array, albeit with one fewer spatial dimension and from a perspective defined by the projection vector. Contrast this with existing deep learning dimensionality-reduction techniques that produce as output only a black-box latent vector that has no readily-interpretable physical meaning with respect to the anatomical structures shown in the three-dimensional voxel array (e.g., a latent vector is not a pixel array that visually depicts anatomical structures).

Furthermore, note that such two-dimensional projection image can, as described herein, be considered as a dimensionally-reduced representation of the three-dimensional voxel array that has not hidden, obscured, or lost substantive voxel content that is dispositive or pertinent to the deep learning inferencing task. More specifically, the deep learning neural network can, as described herein, be trained in a serial pipeline with a separate deep learning neural network that is configured to perform the deep learning inferencing task on inputted two-dimensional projection images. Such serial pipeline training can, as described herein, cause the deep learning neural network to learn how to output weight maps and projection vectors that can minimize or otherwise reduce errors in the deep learning inferencing task. In other words, such serial pipeline training can cause the deep learning neural network to learn how to output weight maps which emphasize (e.g., give higher weight to) voxels that are pertinent or dispositive with respect to the deep learning inferencing task and which de-emphasize (e.g., give lower weight to) voxels that are not pertinent or dispositive with respect to the deep learning inferencing task. Moreover, such serial pipeline training can also cause the deep learning neural network to learn how to output projection vectors that define directions along which voxels that are pertinent or dispositive with respect to the deep learning inferencing task are well-visible (e.g., are not hidden or obfuscated). Accordingly, generating the two-dimensional projection image based on the weight map and based on the projection vector can cause whatever content of the three-dimensional voxel array that is pertinent or dispositive to the deep learning inferencing task to be visible in the two-dimensional projection image. Contrast this with existing analytical dimensionality-reduction techniques that produce as output two-dimensional projections that may hide, obscure, or lose voxel content that is pertinent or dispositive with respect to the deep learning inferencing task.

Thus, rather than training a deep learning neural network to directly produce as output a latent vector representing an inputted three-dimensional voxel array, various embodiments described herein can instead involve training a deep learning neural network to produce as output a weight map and a projection vector corresponding to an inputted three-dimensional voxel array, where a two-dimensional projection of the inputted three-dimensional voxel array can be obtained by multiplying in element-wise fashion the weight map by the inputted three-dimensional voxel array and by projecting such product along a direction indicated by the projection vector.

Various embodiments described herein can be considered as a computerized tool (e.g., any suitable combination of computer-executable hardware or computer-executable software) that can facilitate interpretable task-specific dimensionality-reduction. In various aspects, such computerized tool can comprise an access component, a parameter component, a projection component, or a display component.

In various embodiments, there can be a three-dimensional medical image. In various aspects, the three-dimensional medical image can depict one or more anatomical structures (e.g., tissues, organs, body parts, or portions thereof) of a medical patient (e.g., human, animal, or otherwise). In various instances, the three-dimensional medical image can be a considered as a three-dimensional array of voxels. In various cases, the three-dimensional medical image can have any suitable number or arrangement of voxels. For example, the three-dimensional medical image can be an a-by-b-by-c array of voxels, for any suitable positive integers a, b, and c, thereby yielding a total of abc voxels. In various aspects, the three-dimensional medical image can be generated or otherwise captured by any suitable medical imaging device, such as a CT scanner, an MRI scanner, an X-ray scanner, a PET scanner, or an ultrasound scanner. In various instances, the three-dimensional medical image can have undergone any suitable image reconstruction technique (e.g., filtered back projection).

In various embodiments, it can be desired to perform any suitable inferencing task with respect to the one or more anatomical structures depicted in the three-dimensional medical image. Non-limiting examples of such inferencing task can include symptom classification, orientation determination, principal plane localization, landmark localization, or display field of view determination. In any case, to reduce consumption of computing resources, it can be desired to perform the inferencing task on one or more dimensionally-reduced representations of the three-dimensional medical image, rather than on the three-dimensional medical image itself. So, it can be desirable for such one or more dimensionally-reduced representations to not hide, obscure, or otherwise lose voxel content of the three-dimensional medical image that is pertinent or dispositive with respect to the inferencing task. Moreover, it can also be desirable for such one or more dimensionally-reduced representations to be easily visually interpretable or understandable to a medical professional or technician. In various aspects, the computerized tool, as described herein, can facilitate generation of such interpretable and task-specific dimensionally-reduced representations of the three-dimensional medical image.

In various embodiments, the access component of the computerized tool can electronically receive or otherwise electronically access the three-dimensional medical image. In some aspects, the access component can electronically retrieve the three-dimensional medical image from any suitable centralized or decentralized data structures (e.g., graph data structures, relational data structures, hybrid data structures), whether remote from or local to the access component. For example, the access component can retrieve the three-dimensional medical image from whatever medical imaging device generated or captured the three-dimensional medical image. In any case, the access component can electronically obtain or access the three-dimensional medical image, such that other components of the computerized tool can electronically interact with (e.g., read, write, edit, copy, manipulate) the three-dimensional medical image.

In various aspects, the parameter component of the computerized tool can electronically store, maintain, control, or otherwise access a deep learning neural network. In various instances, the deep learning neural network can exhibit any suitable internal architecture. For example, the deep learning neural network can include any suitable numbers of any suitable types of layers (e.g., input layer, one or more hidden layers, output layer, any of which can be convolutional layers, dense layers, non-linearity layers, pooling layers, batch normalization layers, or padding layers). As another example, the deep learning neural network can include any suitable numbers of neurons in various layers (e.g., different layers can have the same or different numbers of neurons as each other). As yet another example, the deep learning neural network can include any suitable activation functions (e.g., softmax, sigmoid, hyperbolic tangent, rectified linear unit) in various neurons (e.g., different neurons can have the same or different activation functions as each other). As still another example, the deep learning neural network can include any suitable interneuron connections or interlayer connections (e.g., forward connections, skip connections, recurrent connections).

In any case, the deep learning neural network can be configured, as described herein, to receive as input three-dimensional medical images and to produce as output weight maps and projection vectors based on those inputted three-dimensional medical images. Accordingly, the parameter component can electronically execute the deep learning neural network on the three-dimensional medical image, thereby yielding a voxel-wise weight map and a set of projection vectors. More specifically, the parameter component can feed the three-dimensional medical image to an input layer of the deep learning neural network, the three-dimensional medical image can complete a forward pass through one or more hidden layers of the deep learning neural network, and an output layer of the deep learning neural network can compute the voxel-wise weight map and the set of projection vectors based on activations generated by the one or more hidden layers.

In various aspects, the voxel-wise weight map can be considered as a collection of weights that respectively correspond to the voxels of the three-dimensional medical image. That is, the voxel-wise weight map can have the same size or format as the three-dimensional medical image. So, if the three-dimensional medical image is an a-by-b-by-c array of voxels, then the voxel-wise weight map can be an a-by-b-by-c array of weights, where each weight of the voxel-wise weight map can be a non-negative scalar coefficient that corresponds to a respective voxel of the three-dimensional medical image. In various instances, a weight's magnitude can range from any suitable minimum threshold value (e.g., zero) to any suitable maximum threshold value (e.g., one). In various cases, a weight of the voxel-wise weight map can be considered as indicating or otherwise representing how important, pertinent, or dispositive a respective voxel of the three-dimensional medical image is with respect to the inferencing task that is desired to be performed. For example, suppose that a particular voxel of the three-dimensional medical image corresponds to a low-magnitude (e.g., near the minimum threshold value) weight in the voxel-wise weight map. This can mean that the deep learning neural network has inferred that the particular voxel is not important, pertinent, or dispositive with respect to the inferencing task that is desired to be performed. In contrast, suppose that the particular voxel instead corresponds to a high-magnitude (e.g., near the maximum threshold value) weight in the voxel-wise weight map. This can instead mean that the deep learning neural network has inferred that the particular voxel is important, pertinent, or dispositive with respect to the inferencing task that is desired to be performed.

In various aspects, the set of projection vectors can include any suitable number of projection vectors. In various instances, a projection vector can be any suitable vector having any suitable magnitude (e.g., can be a normalized vector having a magnitude of unity) and that defines, indicates, or otherwise represents a direction within three-dimensional space and thus within a coordinate system of the three-dimensional medical image. For example, three-dimensional space, and thus the three-dimensional medical image, can be considered as being spanned by three unit-vectors (e.g., an x-direction unit vector, a y-direction unit vector, and a z-direction unit vector). Accordingly, a projection vector can have three scalar elements which collectively represent a linear combination of such three unit-vectors (e.g., such three scalar elements can be considered as the principal vectorial components of the projection vector), thereby defining a unique direction in three-dimensional space and thus within the three-dimensional medical image. As another example, three-dimensional space, and thus the three-dimensional medical image, can be considered as having three principal axes (e.g., an x-axis, a y-axis, and a z-axis). Accordingly, a projection vector can have three scalar elements, each representing an angular displacement from a respective one of such three principal axes (e.g., such three scalar elements can be considered as the principal angular components of the projection vector), thereby defining a unique direction in three-dimensional space and thus within the three-dimensional medical image.

In various embodiments, the projection component of the computerized tool can electronically generate a set of two-dimensional projection images, based on the voxel-wise weight map and the set of projection vectors. More specifically, the projection component can multiply, in element-wise fashion (e.g., as opposed to tensor product multiplication), the three-dimensional medical image by the voxel-wise weight map. In various aspects, such element-wise multiplication can yield an altered three-dimensional medical image. For example, as mentioned above, the three-dimensional medical image can be an a-by-b-by-c array of voxels, and the voxel-wise weight map can be an a-by-b-by-c array of weights. In such case, the altered three-dimensional medical image can be an a-by-b-by-c array of voxels, where each voxel of the altered three-dimensional medical image can be equal to a product between a respective voxel of the three-dimensional medical image and a respective weight of the voxel-wise weight map. Accordingly, voxels in the three-dimensional medical image that correspond to weights with high magnitudes can be considered as being preserved or scaled up in the altered three-dimensional medical image. Conversely, voxels in the three-dimensional medical image that correspond to weights with low magnitudes can be considered as being scaled down in the altered three-dimensional medical image. In any case, the projection component can project (e.g., via MaxIP or MIP) the altered three-dimensional medical image (e.g., not the original three-dimensional medical image) along each of the set of projection vectors (e.g., again, each projection vector can be considered as defining a unique direction in three-dimensional space), thereby yielding the set two-dimensional projection images.

Note that each of the set of two-dimensional projection images can be considered as visually illustrating a two-dimensional perspective view of the same anatomical structures that are depicted in the three-dimensional medical image. Accordingly, each of the set of two-dimensional projection images can be considered as a visually-interpretable or understandable dimensionally-reduced representation of the three-dimensional medical image.

Moreover, note that, as described herein, the deep learning neural network can be trained so that whichever voxels of the three-dimensional medical image that are pertinent or dispositive with respect to the inferencing task are more heavily weighted in the voxel-wise weight map and are well-visible when viewed from the perspectives of the set of projection vectors. Accordingly, because the set of two-dimensional projection images can be generated based on the voxel-wise weight map and the set of projection vectors, such task-pertinent or task-dispositive voxel content can be easily visible or otherwise visually emphasized in the set of two-dimensional projection images. In other words, such task-pertinent or task-dispositive voxel content can be not hidden, obscured, or lost in the set of two-dimensional projection images. In still other words, the set of two-dimensional projection images can be considered as being specific to or otherwise tailored to the inferencing task that is desired to be performed.

In various embodiments, the display component of the computerized tool can electronically render, on any suitable electronic display (e.g., computer screen, computer monitor, graphical user-interface), any of the set of two-dimensional projection images. Thus, a user, technician, or medical professional can visually inspect or view the set of two-dimensional projection images as rendered on the electronic display, which can aid the user, technician, or medical professional in making a diagnosis or prognosis.

To help cause the three-dimensional weight map and the set of projection vectors to be accurate (e.g., to help cause whichever voxels are pertinent or dispositive with respect to the inferencing task to be more heavily weighted in the voxel-wise weight map and to be well-visible from the perspectives of the set of projection vectors), the deep learning neural network can first undergo any suitable type or paradigm of training (e.g., supervised training, unsupervised training, reinforcement learning). Accordingly, in various aspects, the access component can receive, retrieve, or otherwise access a training dataset, and the computerized tool can comprise a training component that can train the deep learning neural network on the training dataset.

In some instances, the training dataset can be an annotated training dataset. In such cases, the training dataset can include a set of training three-dimensional medical images and a set of ground-truth annotations that respectively correspond to the set of training three-dimensional medical images. In various aspects, a training three-dimensional medical image can have the same number or arrangement of voxels as the three-dimensional medical image discussed above (e.g., if the three-dimensional medical image is an a-by-b-by-c array of voxels that depicts anatomical structures of a medical patient, then each training three-dimensional medical image can likewise be an a-by-b-by-c array of voxels that depicts respective anatomical structures of a respective medical patient).

In various instances, a ground-truth annotation can be any suitable electronic data that indicates or otherwise represents a correct or accurate inferencing task output that is known or deemed to correspond to a respective training three-dimensional medical image. For example, suppose that the inferencing task is symptom classification. In such case, a ground-truth annotation can be a correct or accurate symptom classification label that is known or deemed to correspond to a respective training three-dimensional medical image. As another example, suppose that the inferencing task is orientation determination. In such case, a ground-truth annotation can indicate a correct or accurate orientation that is known or deemed to be exhibited by a respective training three-dimensional medical image. As even another example, suppose that the inferencing task is landmark localization. In such case, a ground-truth annotation can indicate a correct or accurate location of a specific anatomical landmark that is depicted within a respective training three-dimensional medical image. As still another example, suppose that the inferencing task is display field of view determination. In such case, a ground-truth annotation can indicate a correct or accurate display field of view that is known or deemed to be exhibited by a respective training three-dimensional medical image.

Furthermore, the access component can electronically access, from any suitable source, a second deep learning neural network. In various cases, the second deep learning neural network can exhibit any suitable internal architecture. For example, the second deep learning neural network can include any suitable numbers of any suitable types of layers (e.g., input layer, one or more hidden layers, output layer, any of which can be convolutional layers, dense layers, non-linearity layers, pooling layers, batch normalization layers, or padding layers). As another example, the second deep learning neural network can include any suitable numbers of neurons in various layers (e.g., different layers can have the same or different numbers of neurons as each other). As yet another example, the second deep learning neural network can include any suitable activation functions (e.g., softmax, sigmoid, hyperbolic tangent, rectified linear unit) in various neurons (e.g., different neurons can have the same or different activation functions as each other). As still another example, the second deep learning neural network can include any suitable interneuron connections or interlayer connections (e.g., forward connections, skip connections, recurrent connections). In any case, the second deep learning neural network can be configured to perform the inferencing task on inputted two-dimensional projections.

In various aspects, the training component can perform supervised training on the deep learning neural network, based on the training dataset and based on the second deep learning neural network. Prior to the start of such supervised training, the internal parameters (e.g., weights, biases, convolutional kernels) of the deep learning neural network and of the second deep learning neural network can be randomly initialized.

In various aspects, the training component can select from the training dataset any suitable training three-dimensional medical image and any suitable ground-truth annotation corresponding to such selected training three-dimensional medical image. In various instances, the training component can feed the selected training three-dimensional medical image to the deep learning neural network, which can cause the deep learning neural network to produce a first output and a second output. For example, the training component can feed the training three-dimensional medical image to an input layer of the deep learning neural network, the training three-dimensional medical image can complete a forward pass through one or more hidden layers of the deep learning neural network, and an output layer of the deep learning neural network can calculate the first output and the second output based on activations from the one or more hidden layers of the deep learning neural network. Note that, in various cases, the sizes or formats of the first output and the second output can be controlled or otherwise determined by the number or arrangement of neurons in the output layer (e.g., the first output and the second output can be forced to have desired sizes or desired arrangements of numerical elements, by adding neurons to or removing neurons from the output layer of the deep learning neural network).

In various aspects, the first output can be considered as the predicted or inferred voxel-wise weight map that the deep learning neural network believes should correspond to the selected training three-dimensional medical image. That is, the first output can be considered as voxel-wise scalar weights that respectively indicate which voxels of the selected training three-dimensional medical image are, in the opinion of the deep learning neural network, more pertinent/dispositive with respect to the inferencing task and which voxel are less so. Similarly, the second output can be considered as the predicted or inferred set of projection vectors that the deep learning neural network believes should correspond to the selected training three-dimensional medical image. That is, the second output can be considered as indicating a set of three-space directions along which, in the opinion of the deep learning neural network, such pertinent/dispositive voxels are well-visible or unobscured. Note that, if the deep learning neural network has so far undergone no or little training, then the first output and the second output can be highly inaccurate.

In any case, the training component can generate a training set of two-dimensional projection images, based on the first output and the second output. More specifically, because the first output can be considered as the predicted or inferred voxel-wise weight map that the deep learning neural network believes should correspond to the selected training three-dimensional medical image, the training component can multiply, in element-wise fashion, the first output with the selected training three-dimensional medical image. Such element-wise multiplication can yield an altered training three-dimensional medical image. Moreover, because the second output can be considered as the predicted or inferred set of projection vectors that the deep learning neural network believes should correspond to the selected training three-dimensional medical image, the training component can project (e.g., via MaxIP or MIP) the altered training three-dimensional medical image along each of the projection vectors indicated by the second output. This can yield the training set of two-dimensional projection images.

In various aspects, the training component can feed the training set of two-dimensional projection images to the second deep learning neural network, which can cause the second deep learning neural network to produce a third output. For example, the training component can feed the training set of two-dimensional projection images to an input layer of the second deep learning neural network, the training set of two-dimensional projection images can complete a forward pass through one or more hidden layers of the second deep learning neural network, and an output layer of the second deep learning neural network can calculate the third output based on activations from the one or more hidden layers of the second deep learning neural network. As above, note that, in various cases, the size or format of the third output can be controlled or otherwise determined by the number or arrangement of neurons in the output layer of the second deep learning neural network (e.g., the third output can be forced to have a desired size or a desired arrangement of numerical elements, by adding neurons to or removing neurons from the output layer of the second deep learning neural network).

In any case, the third output can be considered as the predicted or inferred result (e.g., predicted or inferred symptom classification label, predicted or inferred orientation determination, predicted or inferred landmark localization, predicted or inferred display field of view determination) that the second deep learning neural network believes should be obtained when the inferencing task is performed on the training set of two-dimensional projection images. In stark contrast, the selected ground-truth annotation can be considered as the correct or accurate result (e.g., correct or accurate symptom classification label, correct or accurate orientation determination, correct or accurate landmark localization, correct or accurate display field of view determination) that is known or deemed to be obtained when the inferencing task is properly performed on the anatomical structures depicted in the selected training three-dimensional medical image. As above, note that, if the second deep learning neural network has so far undergone no or little training, then the third output can be highly inaccurate (e.g., the substantive content of the third output can be very different from that of the selected ground-truth annotation).

Note that, in some cases, the third output can have the same size, format, or dimensionality as the selected ground-truth annotation. For example, suppose that the inferencing task is image classification. In such case, the third output can be a predicted or inferred classification label (e.g., a scalar) that the second deep learning neural network believes should correspond to the set of two-dimensional projection images, and the selected ground-truth annotation can be a correct or accurate classification label (e.g., also a scalar) that is known or deemed to correspond to the selected training three-dimensional medical image.

In other cases, however, the third output can have a different size, format, or dimensionality than the selected ground-truth annotation. For example, suppose that the inferencing task is image segmentation. In such case, the third output can be a set of inferred or predicted two-dimensional segmentation masks that the second deep learning neural network believes should correspond to the set of two-dimensional projection images (e.g., one two-dimensional segmentation mask per two-dimensional projection image), and the selected ground-truth annotation can instead be a single correct or accurate three-dimensional segmentation mask that is known or deemed to correspond to the selected training three-dimensional medical image. In such case, the training component can project the selected ground-truth annotation along each of the projection vectors indicated by the second output, thereby yielding a set of projected ground-truth annotations (e.g., one projected ground-truth annotation per projection vector). Note that such set of projected ground-truth annotations can be considered as having the same size, format, or dimensionality as the third output (e.g., projecting a three-dimensional segmentation mask along a set of projection vectors can yield a set of two-dimensional segmentation masks).

In situations where the third output has the same size, format, or dimensionality as the selected ground-truth annotation, the training component can compute any suitable error or loss (e.g., mean absolute error (MAE), mean squared error (MSE), cross-entropy) between the third output and the selected ground-truth annotation. In situations where the third output instead does not have the same size, format, or dimensionality as the selected ground-truth annotation, the training component can compute any suitable error or loss (e.g., MAE, MSE, cross-entropy) between the third output and the set of projected ground-truth annotations. In any case, the training component can compute an error or loss based on the third output and based on the selected ground-truth annotation, and the training component can update the internal parameters of the deep learning neural network and of the second deep learning neural network by performing backpropagation (e.g., stochastic gradient descent) driven by the computed error or loss.

In various instances, such supervised training procedure can be repeated for each training three-dimensional medical image in the training dataset, with the result being that the internal parameters of the deep learning neural network can become iteratively optimized to accurately generate voxel-wise weight maps and sets of projection vectors based on inputted three-dimensional medical images, and with the result also being that the internal parameters of the second deep learning neural network can become iteratively optimized to accurately perform the inferencing task on inputted two-dimensional projections. More specifically, such training can cause the second deep learning neural network to learn how to correctly perform the inferencing task (e.g., to minimize the computed error between the third output and the selected ground-truth annotation), and such training can commensurately cause the deep learning neural network to learn how to produce weight maps and projection vectors that help the second deep learning neural network to accurately perform the inferencing task (e.g., that also help to minimize the computed error between the third output and the selected ground-truth annotation). In other words, as the computed error between the third output and the selected ground-truth annotation shrinks, the first output (e.g., the predicted or inferred weight map) can better assign heavier weights to voxels that are more important, pertinent, or dispositive with respect to the inferencing task and can better assign lighter weights to voxels that are less important, pertinent, or dispositive with respect to the inferencing task. Likewise, as the computed error between the third output and the selected ground-truth annotation shrinks, the second output (e.g., the predicted or inferred projection vectors) can provide better, less obstructed perspective views of voxels that are more important, pertinent, or dispositive with respect to the inferencing task. In various cases, such training setup can be considered as a serial pipeline in which the deep learning neural network is upstream of the second deep learning neural network.

In various cases, the training component can implement any suitable training batch sizes, any suitable training termination criteria, or any suitable error, loss, or objective functions when training the deep learning neural network and the second deep learning neural network.

In some instances, the training component can implement a two-phase training procedure when training the deep learning neural network and the second deep learning neural network. In particular, during a first phase of training, the training component can proceed as described above (e.g., selecting a training three-dimensional medical image and a corresponding ground-truth annotation, executing the deep learning neural network and then executing the second deep learning neural network, and updating internal parameters of both the deep learning neural network and the second deep learning neural network via backpropagation). In a second phase of training (e.g., once any suitable training phase termination criterion has been achieved), the training component can freeze the internal parameters of the deep learning neural network and can update via backpropagation only the internal parameters of the second deep learning neural network. However, this is a mere non-limiting example. In other cases, the second phase of training can instead involve freezing the internal parameters of the second deep learning neural network and updating via backpropagation only the internal parameters of the deep learning neural network.

In any case, training the deep learning neural network in a serial pipeline with the second deep learning neural network, as described herein, can cause the deep learning neural network to learn how to accurately generate weight maps and projection vectors (e.g., to learn how to generate weight maps that weigh task-pertinent/task-dispositive voxels more heavily, and to learn how to generate projection vectors along which task-pertinent/task-dispositive voxels are not hidden or obstructed). As described herein, such weight maps and projection vectors can be implemented to create dimensionally-reduced representations of three-dimensional medical images that are easily interpretable and that, at the same time, do not hide or obscure task-relevant substantive content.

Various embodiments described herein can be employed to use hardware or software to solve problems that are highly technical in nature (e.g., to facilitate interpretable task-specific dimensionality reduction), that are not abstract and that cannot be performed as a set of mental acts by a human. Further, some of the processes performed can be performed by a specialized computer (e.g., a deep learning neural network having internal parameters such as convolutional kernels) for carrying out defined acts related to interpretable task-specific dimensionality reduction. For example, such defined acts can include: accessing, by a device operatively coupled to a processor, a three-dimensional medical image; generating, by the device and via execution of a first deep learning neural network, a voxel-wise weight map corresponding to the three-dimensional medical image and a set of projection vectors corresponding to the three-dimensional medical image; and generating, by the device, a set of two-dimensional projection images of the three-dimensional medical image, based on the voxel-wise weight map and the set of projection vectors. In some instances, the first deep learning neural network can be trained in a serial pipeline with a second deep learning neural network that is configured to perform an inferencing task on two-dimensional inputs. In various cases, this can cause the set of two-dimensional projection images to be tailored to or specific to the inferencing task (e.g., can cause the set of two-dimensional projection images to not hide or lose substantive voxel content that is pertinent or dispositive with respect to the inferencing task).

Such defined acts are not performed manually by humans. Indeed, neither the human mind nor a human with pen and paper can electronically access a three-dimensional voxel array, electronically execute a deep learning neural network on the three-dimensional voxel array so as to generate a weight map and at least one projection vector, and electronically use the weight map and the at least one projection vector to create at least one two-dimensional projection image of the three-dimensional voxel array. Indeed, a deep learning neural network is an inherently-computerized construct that simply cannot be implemented in any way by the human mind without computers. Similarly, three-dimensional medical images are inherently computerized constructs that are generated or captured by electronic medical hardware (e.g., CT scanners, MRI scanners, X-ray scanners, PET scanners, ultrasound scanners) and not in any way by the human mind without computers. Accordingly, a computerized tool that can train or execute a deep learning neural network to produce two-dimensional projections of three-dimensional medical images is likewise inherently-computerized and cannot be implemented in any sensible, practical, or reasonable way without computers.

Moreover, various embodiments described herein can integrate into a practical application various teachings relating to interpretable task-specific dimensionality-reduction. As explained above, it can be desired to perform an inferencing task on a dimensionally-reduced representation of a three-dimensional voxel array. Some existing techniques generate such dimensionally-reduced representation analytically. In such cases, the resultant dimensionally-reduced representation (e.g., an MIP projection of the three-dimensional voxel array) is easily visually interpretable by a medical professional, but often can hide, obscure, or not depict at all substantive voxel content that is pertinent or dispositive with respect to the inferencing task. Other existing techniques generate such dimensionally-reduced representation via a deep learning encoder. In such cases, the resultant dimensionally-reduced representation (e.g., a latent vector representing the three-dimensional voxel array) can contain (e.g., in compressed form) all substantive content of the three-dimensional voxel array, but cannot be considered as easily visually interpretable (e.g., a latent vector is not a picture).

Various embodiments described herein can address one or more of these technical problems. Specifically, the present inventors devised various embodiments that can utilize deep learning to create a dimensionally-reduced representation of a three-dimensional voxel array, which dimensionally-reduced representation is easily visually interpretable and, at the same time, does not hide, obscure, or lose substantive voxel content that is pertinent or dispositive with respect to the inferencing task that is desired. In particular, various embodiments can involve training a deep learning neural network, in a serial pipeline fashion as described herein, to receive as input a three-dimensional voxel array and to produce as output both a voxel-wise weight map and at least one projection vector. In various instances, the voxel-wise weight map can be considered as assigning weights to the voxels of the three-dimensional voxel array, which weights respectively indicate how much or how little pertinence the various voxels have with respect to the desired inferencing task. Similarly, in various cases, the at least one projection vector can be considered as defining a linear direction in three-dimensional space, along which direction highly pertinent or dispositive voxels of the three-dimensional voxel array are well-visible or unobscured. In various aspects, the three-dimensional voxel array can be multiplied in element-wise fashion by the voxel-wise weight map, thereby yielding an intensity-altered three-dimensional voxel array. Moreover, in various instances, the intensity-altered three-dimensional voxel array can be projected (e.g., via MIP) along the at least one projection vector, thereby yielding at least one two-dimensional projection image. Due to how the deep learning neural network can be trained as described herein, the at least one two-dimensional projection image can be considered as a dimensionally-reduced representation of the three-dimensional voxel array, which dimensionally-reduced representation is easily visually understandable (e.g., it can be a two-dimensional picture, as opposed to a latent vector) and that does not hide, obscure, or lose voxel content that is pertinent or dispositive with respect to the inferencing task, in stark contrast to existing techniques.

Accordingly, various embodiments described herein can be considered as improving the interpretability of deep learning dimensionality-reduction. That is, various embodiments described herein can ameliorate various disadvantages of existing techniques. Indeed, explainable artificial intelligence is a burgeoning area of research and development which seeks to reduce the black-box opaqueness that normally accompanies deep learning. As described herein, various embodiments devised by the present inventors can be considered as reducing such black-box opaqueness with respect to deep learning dimensionality-reduction. Thus, various embodiments described herein certainly constitute a concrete and tangible technical improvement in the field of dimensionality-reduction, and such embodiments clearly qualify as useful and practical applications of computers.

Furthermore, various embodiments described herein can control real-world tangible devices based on the disclosed teachings. For example, various embodiments described herein can electronically execute (or train) real-world deep learning neural networks on real-world medical images (e.g., CT images, MRI images, X-ray images, PET images, ultrasound images), and can electronically render any results produced by such real-world deep learning neural networks on real-world computer screens.

It should be appreciated that the herein figures and description provide non-limiting examples of various embodiments and are not necessarily drawn to scale.

FIG. 1 illustrates a block diagram of an example, non-limiting system 100 that can facilitate interpretable task-specific dimensionality reduction in accordance with one or more embodiments described herein. As shown, a dimensionality reduction system 102 can be electronically integrated, via any suitable wired or wireless electronic connections, with a 3D medical image 104.

In various embodiments, the 3D medical image 104 can be a three-dimensional voxel array that exhibits any suitable number or any suitable arrangement of voxels. In various aspects, the 3D medical image 104 can depict any suitable anatomical structure of any suitable medical patient. As some non-limiting examples, the anatomical structure can be any suitable tissue of the medical patient (e.g., bone tissue, lung tissue, muscle tissue, brain tissue), any suitable organ of the medical patient (e.g., heart, liver, lung, brain, eye, colon, blood vessel), any suitable bodily fluid of the medical patient (e.g., blood, amniotic fluid), any other suitable body part of the medical patient, or any suitable portion thereof. In various instances, the 3D medical image 104 can be generated or otherwise captured by any suitable medical imaging device, medical imaging equipment, or medical imaging modality (not shown). As a non-limiting example, the 3D medical image 104 can be generated or otherwise captured by a CT scanner, in which case the 3D medical image 104 can be considered as a CT scanned image. As another non-limiting example, the 3D medical image 104 can be generated or otherwise captured by an MRI scanner, in which case the 3D medical image 104 can be considered as an MRI scanned image. As yet another non-limiting example, the 3D medical image 104 can be generated or otherwise captured by a PET scanner, in which case the 3D medical image 104 can be considered as a PET scanned image. As still another non-limiting example, the 3D medical image 104 can be generated or otherwise captured by an X-ray scanner, in which case the 3D medical image 104 can be considered as an X-ray scanned image. As even another non-limiting example, the 3D medical image 104 can be generated or otherwise captured by an ultrasound scanner, in which case the 3D medical image 104 can be considered as an ultrasound scanned image. Moreover, the 3D medical image 104 can have undergone any suitable image reconstruction techniques, such as filtered back projection.

In various embodiments, it can be desired to perform any suitable inferencing task with respect to the anatomical structure illustrated in the 3D medical image 104. As a non-limiting example, the inferencing task can be symptom classification. In such case, it can be desired to determine to which of two or more pathological symptom classes the anatomical structure illustrated in the 3D medical image 104 belongs (e.g., aneurysm classification can involve determining whether or not the anatomical structure exhibits an aneurysm; vessel occlusion classification can involve determining whether or not the anatomical structure exhibits an occluded blood vessel; tumor classification can involve determining whether or not the anatomical structure exhibits a tumorous growth; calcification classification can involve determining whether or not the anatomical structure exhibits calcified tissue). As another non-limiting example, the inferencing task can be orientation determination. In such case, it can be desired to determine how the anatomical structure is spatially oriented or positioned as illustrated in the 3D medical image 104 (e.g., to determine in which direction an anterior-posterior axis of the anatomical structure extends, to determine in which direction a superior-inferior axis of the anatomical structure extends, to determine in which direction a right-left axis of the anatomical structure extends). As yet another non-limiting example, the inferencing task can be principal plane localization. In such case, it can be desired to determine how the principal planes (e.g., sagittal, coronal, axial) of the anatomical structure are located or oriented as illustrated in the 3D medical image 104. As still another non-limiting example, the inferencing task can be landmark localization. In such case, it can be desired to determine where a specific landmark (e.g., car canal, nasal bone, occipital lobe) of the anatomical structure is located as illustrated in the 3D medical image 104. As even another non-limiting example, the inferencing task can be display field of view determination. In such case, it can be desired to determine what display field of view setting (e.g., measured in centimeters or millimeters) was implemented to capture the 3D medical image 104.

In any case, electronically performing the inferencing task directly on the 3D medical image 104 can result in over-consumption of computing time or computing memory. Thus, it can instead be desired to electronically perform the inferencing task on one or more dimensionally-reduced representations of the 3D medical image 104. To help cause the inferencing task to be performed reliably, it can be desired for such one or more dimensionally-reduced representations to have not lost or obscured voxel content that is pertinent, dispositive, or otherwise relevant to the inferencing task. However, it can also be desired for such one or more dimensionally-reduced representations to be easily visually interpretable to a medical professional that is attending to the medical patient whose anatomical structure is depicted in the 3D medical image 104. As described herein, the dimensionality reduction system 102 can electronically generate such one or more dimensionally-reduced representations of the 3D medical image 104.

In various embodiments, the dimensionality reduction system 102 can comprise a processor 106 (e.g., computer processing unit, microprocessor) and a non-transitory computer-readable memory 108 that is operably or operatively or communicatively connected or coupled to the processor 106. The non-transitory computer-readable memory 108 can store computer-executable instructions which, upon execution by the processor 106, can cause the processor 106 or other components of the dimensionality reduction system 102 (e.g., access component 110, parameter component 112, projection component 114, display component 116) to perform one or more acts. In various embodiments, the non-transitory computer-readable memory 108 can store computer-executable components (e.g., access component 110, parameter component 112, projection component 114, display component 116), and the processor 106 can execute the computer-executable components.

In various embodiments, the dimensionality reduction system 102 can comprise an access component 110. In various aspects, the access component 110 can electronically receive or otherwise electronically access the 3D medical image 104. In various instances, the access component 110 can electronically retrieve the 3D medical image 104 from any suitable centralized or decentralized data structures (not shown) or from any suitable centralized or decentralized computing devices (not shown). As a non-limiting example, whatever medical imaging device (e.g., CT scanner, MRI scanner, X-ray scanner, PET scanner, ultrasound scanner) that generated or captured the 3D medical image 104 can transmit the 3D medical image 104 to the access component 110. In any case, the access component 110 can electronically obtain or access the 3D medical image 104, such that other components of the dimensionality reduction system 102 can electronically interact with the 3D medical image 104.

In various embodiments, the dimensionality reduction system 102 can comprise a parameter component 112. In various aspects, as described herein, the parameter component 112 can execute a deep learning neural network on the 3D medical image 104, thereby yielding a three-dimensional weight map and a set of projection vectors.

In various embodiments, the dimensionality reduction system 102 can comprise a projection component 114. In various instances, as described herein, the projection component 114 can generate a set of two-dimensional projection images of the 3D medical image 104, based on the three-dimensional weight map and the set of projection vectors.

In various embodiments, as described herein, the dimensionality reduction system 102 can comprise a display component 116. In various cases, as described herein, the display component 116 can electronically render the set of two-dimensional projection images on any suitable electronic display.

Figure 2:
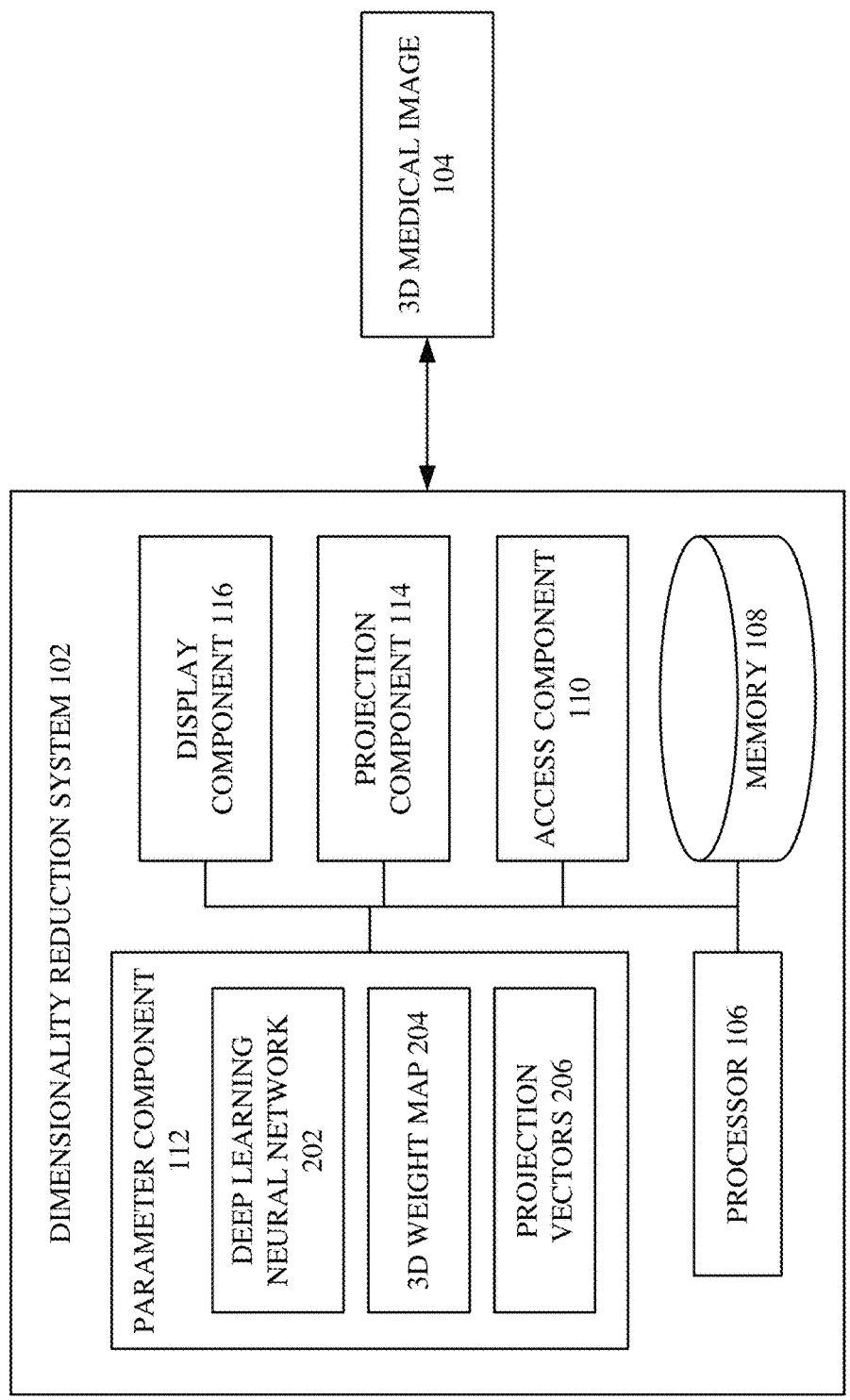
FIG. 2 illustrates a block diagram of an example, non-limiting system including a deep learning neural network, a three-dimensional weight map, and a set of projection vectors that facilitates interpretable task-specific dimensionality reduction in accordance with one or more embodiments described herein.

FIG. 2 illustrates a block diagram of an example, non-limiting system 200 including a deep learning neural network, a three-dimensional weight map, and a set of projection vectors that can facilitate interpretable task-specific dimensionality reduction in accordance with one or more embodiments described herein. As shown, the system 200 can, in some cases, comprise the same components as the system 100, and can further comprise a deep learning neural network 202, a 3D weight map 204, and a set of projection vectors 206.

In various embodiments, the parameter component 112 can electronically store, electronically maintain, electronically control, or otherwise electronically access the deep learning neural network 202. In various aspects, the deep learning neural network 202 can have or otherwise exhibit any suitable internal architecture. For instance, the deep learning neural network 202 can have an input layer, one or more hidden layers, and an output layer. In various instances, any of such layers can be coupled together by any suitable interneuron connections or interlayer connections, such as forward connections, skip connections, or recurrent connections. Furthermore, in various cases, any of such layers can be any suitable types of neural network layers having any suitable learnable or trainable internal parameters. For example, any of such input layer, one or more hidden layers, or output layer can be convolutional layers, whose learnable or trainable parameters can be convolutional kernels. As another example, any of such input layer, one or more hidden layers, or output layer can be dense layers, whose learnable or trainable parameters can be weight matrices or bias values. As still another example, any of such input layer, one or more hidden layers, or output layer can be batch normalization layers, whose learnable or trainable parameters can be shift factors or scale factors. Further still, in various cases, any of such layers can be any suitable types of neural network layers having any suitable fixed or non-trainable internal parameters. For example, any of such input layer, one or more hidden layers, or output layer can be non-linearity layers, padding layers, pooling layers, or concatenation layers.

In various aspects, the parameter component 112 can electronically execute the deep learning neural network 202 on the 3D medical image 104, and such execution can cause the deep learning neural network 202 to produce the 3D weight map 204 and the set of projection vectors 206. Various non-limiting aspects are further described with respect to FIG. 3.

Figure 3:
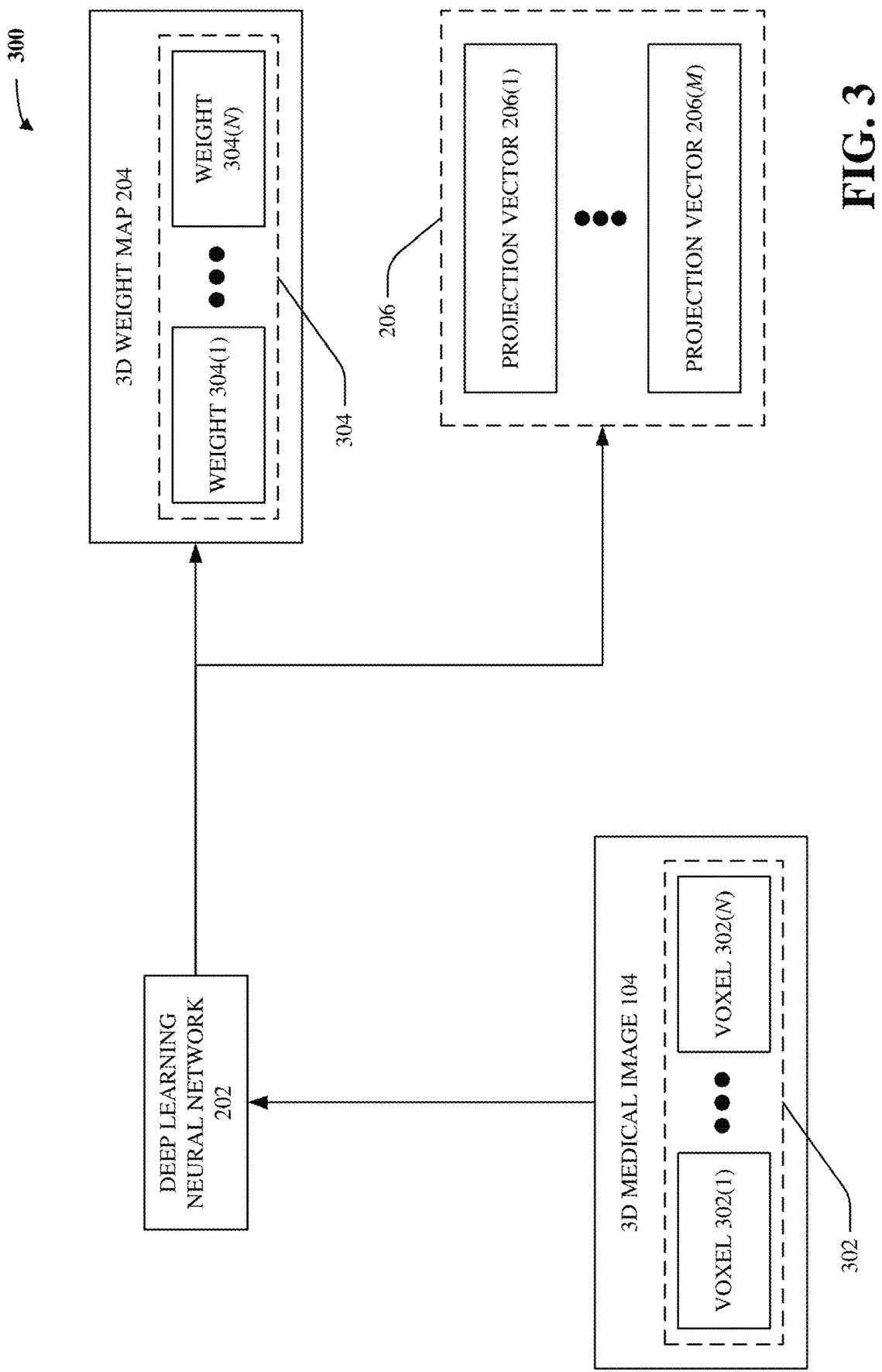
FIG. 3 illustrates an example, non-limiting block diagram showing how a deep learning neural network can generate a three-dimensional weight map and a set of projection vectors in accordance with one or more embodiments described herein.

FIG. 3 illustrates an example, non-limiting block diagram 300 showing how the deep learning neural network 202 can generate the 3D weight map 204 and the set of projection vectors 206 in accordance with one or more embodiments described herein.

In various aspects, as shown, the 3D medical image 104 can comprise a set of voxels 302. In various instances, the set of voxels 302 can comprise n voxels for any suitable positive integer n: a voxel 302(1) to a voxel 302(n). In various cases, the parameter component 112 can feed the 3D medical image 104 (e.g., the set of voxels 302) as input to the deep learning neural network 202. In response, the deep learning neural network 202 can generate the 3D weight map 204 and the set of projection vectors 206. More specifically, the parameter component 112 can provide or otherwise pass the 3D medical image 104 (e.g., the set of voxels 302) to an input layer of the deep learning neural network 202. In various instances, the 3D medical image 104 (e.g., the set of voxels 302) can complete a forward pass through one or more hidden layers of the deep learning neural network 202. In various cases, an output layer of the deep learning neural network 202 can compute or otherwise calculate the 3D weight map 204 and the set of projection vectors 206, based on activation maps generated by the one or more hidden layers of the deep learning neural network 202.

In various aspects, the 3D weight map 204 can be a weight map that exhibits the same dimensionality as the 3D medical image 104. Accordingly, because the 3D medical image 104 can be a three-dimensional array of voxels, the 3D weight map 204 can be a three-dimensional array of weights. More specifically, the 3D weight map 204 comprise a set of weights 304 that respectively correspond (e.g., in one-to-one fashion) to the set of voxels 302 of the 3D medical image 104. Thus, because the set of voxels 302 can comprise n voxels, the set of weights 304 can comprise n weights: a weight 304(1) to a weight 304(n). In various instances, a weight of the set of weights 304 can be a non-negative scalar coefficient whose magnitude can range between any suitable non-negative minimum threshold value and any suitable non-negative maximum threshold value. As a non-limiting example, the minimum threshold value can be 0, and the maximum threshold value can be 1. As another non-limiting example, the minimum threshold value can be greater than 0 but less than 1, and the maximum threshold value can be greater than 1.

In any case, each of the set of weights 304 can be considered as representing how important, pertinent, relevant, or dispositive a respective one of the set of voxels 302 is (in the opinion of the deep learning neural network 202) with respect to the inferencing task that is desired to be performed on the anatomical structure depicted in the 3D medical image 104. As a non-limiting example, the weight 304(1) can correspond to the voxel 302(1). Accordingly, the weight 304(1) can be a scalar coefficient whose magnitude is between the minimum threshold value and the maximum threshold value, and whose magnitude can be considered as indicating how crucial the voxel 302(1) is with respect to performance of the inferencing task. For instance, suppose that the voxel 302(1) belongs to an ear canal depicted in the 3D medical image 104. If the inferencing task is ear canal localization, the voxel 302(1) can be considered as being pertinent or otherwise relevant to the inferencing task (e.g., determining where an ear canal is located within the 3D medical image 104 can be considered as relying heavily upon the voxels that make up an ear canal), and so the weight 304(1) can have a high magnitude (e.g., a magnitude equal to or within any suitable margin of the maximum threshold value). On the other hand, if the inferencing task is instead aneurysm classification, the voxel 302(1) can be considered as not being pertinent or otherwise relevant to the inferencing task (e.g., determining whether or not an aneurysm is depicted in the 3D medical image 104 can be considered as not relying heavily upon the voxels that make up an ear canal), and so the weight 304(1) can instead have a low magnitude (e.g., a magnitude equal to or within any suitable margin of the minimum threshold value).

As another non-limiting example, the weight 304(n) can correspond to the voxel 302(n). Accordingly, the weight 304(n) can be a scalar coefficient whose magnitude is between the minimum threshold value and the maximum threshold value, and whose magnitude can be considered as indicating how crucial the voxel 302(n) is with respect to performance of the inferencing task. For instance, suppose that the voxel 302(n) belongs to a blood vessel depicted in the 3D medical image 104. If the inferencing task is aneurysm classification, the voxel 302(n) can be considered as being pertinent or otherwise relevant to the inferencing task (e.g., determining whether or not an aneurysm is depicted in the 3D medical image 104 can be considered as relying heavily upon the voxels that make up a blood vessel), and so the weight 304(n) can have a high magnitude (e.g., a magnitude equal to or within any suitable margin of the maximum threshold value). On the other hand, if the inferencing task is instead ear canal localization, the voxel 302(n) can be considered as not being pertinent or otherwise relevant to the inferencing task (e.g., determining where an ear canal is located within the 3D medical image 104 can be considered as not relying heavily upon the voxels that make up a blood vessel), and so the weight 304(n) can instead have a low magnitude (e.g., a magnitude equal to or within any suitable margin of the minimum threshold value).

In various aspects, the set of projection vectors 206 can comprise m vectors, for any suitable positive integer m: a projection vector 206(1) to a projection vector 206(m). In various instances, each of the set of projection vectors 206 can define a unique or distinct direction within a coordinate system of the 3D medical image 104. Accordingly, because the 3D medical image 104 can be a three-dimensional array of voxels, each of the set of projection vectors 206 can be a three-element vector that defines or otherwise indicates a unique or distinct three-dimensional direction (e.g., a direction within three-space).

As a non-limiting example, recall that three-dimensional space can be spanned by three principal unit-vectors: $\vec{u}$ which can represent an x-axis unit-vector; $\vec{v}$ which can represent a y-axis unit-vector; and $\vec{w}$ which can represent a z-axis unit-vector. In such case, the projection vector 206(1) can be equal to $\langle i_1, j_1, k_1 \rangle$ for any suitable real numbers $i_1$, $j_1$, and $k_1$, which can be considered as defining a three-dimensional direction given by $i_1\vec{u}+j_1\vec{v}+k_1\vec{w}$. Likewise, in such case, the projection vector 206(m) can be equal to $\langle i_m, j_m, k_m \rangle$ for any suitable real numbers $i_m$, $j_m$, and $k_m$, which can be considered as defining a three-dimensional direction given by $i_m\vec{u}+j_m\vec{v}+k_m\vec{w}$.

As another non-limiting example, recall that three-dimensional space can have three principal axes intersecting at an origin: an x-axis, a y-axis, and a z-axis. In such case, the projection vector 206(1) can be equal to $\langle \theta_{x,1}, \theta_{y,1}, \theta_{z,1} \rangle$, for any suitable real numbers $\theta_{x,1}$, $\theta_{y,1}$, and $\theta_{z,1}$. Here, $\theta_{x,1}$ can be considered as the half-angle of a first cone emanating from the origin and centered about the x-axis, $\theta_{y,1}$ can be considered as the half-angle of a second cone emanating from the origin centered about the y-axis, $\theta_{z,1}$ can be considered as the half-angle of a third cone emanating from the origin and centered about the z-axis, and a line of intersection of such three cones can be considered as the three-dimensional direction defined by the projection vector 206(1). Likewise, the projection vector 206(m) can be equal to $\langle \theta_{x,m}, \theta_{y,m}, \theta_{z,m} \rangle$, for any suitable real numbers $\theta_{x,m}$, $\theta_{y,m}$, and $\theta_{z,m}$. As above, $\theta_{x,m}$ can be considered as the half-angle of a first cone emanating from the origin and centered about the x-axis, $\theta_{y,m}$ can be considered as the half-angle of a second cone emanating from the origin centered about the y-axis, $\theta_{z,m}$ can be considered as the half-angle of a third cone emanating from the origin and centered about the z-axis, and a line of intersection of such three cones can be considered as the three-dimensional direction defined by the projection vector 206(m).

Note that each of the set of projection vectors 206 can have any suitable magnitude. As a non-limiting example, each of the set of projection vectors 206 can be normalized so as to have a magnitude of unity. In some cases, magnitudes of the set of projection vectors 206 can even be unspecified.

In any case, each of the set of projection vectors 206 can be considered as defining a unique or distinct three-dimensional direction along which or from the perspective of which whatever voxels of the set of voxels 302 are considered (according to the deep learning neural network 202) to be important, pertinent, relevant, or dispositive with respect to the inferencing task can be easily visible, can be not visually hidden, or can otherwise not be visually obscured. As a non-limiting example, the projection vector 206(1) can be considered as defining a first three-space direction, such that whatever voxels of the 3D medical image 104 are crucial to the inferencing task can be easily viewed along such first three-space direction or otherwise from the perspective of such first three-space direction. As another non-limiting example, the projection vector 206(m) can be considered as defining an m-th three-space direction, such that whatever voxels of the 3D medical image 104 are crucial to the inferencing task can be easily viewed along such m-th three-space direction or otherwise from the perspective of such m-th three-space direction.

In some cases, a projection vector can indicate or define a sagittal direction, a coronal direction, or an axial direction of the anatomical structure shown in the 3D medical image 104. However, in other cases, a projection vector can indicate or define any suitable oblique direction of the anatomical structure shown in the 3D medical image 104 (e.g., an oblique direction can be neither a sagittal direction, a coronal direction, nor an axial direction).

Figure 4:
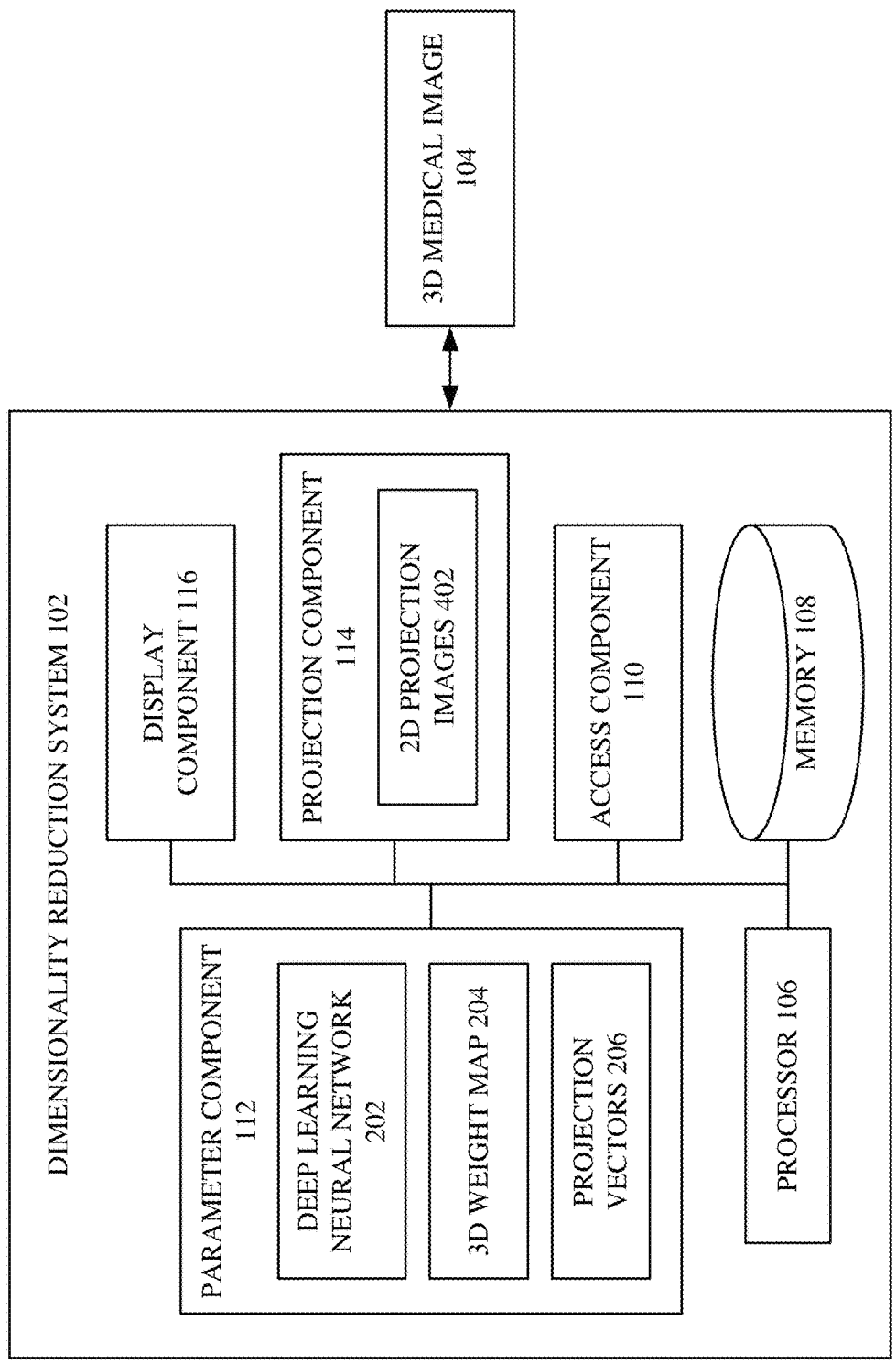
FIG. 4 illustrates a block diagram of an example, non-limiting system including a set of two-dimensional projection images that facilitates interpretable task-specific dimensionality reduction in accordance with one or more embodiments described herein.

FIG. 4 illustrates a block diagram of an example, non-limiting system 400 including a set of two-dimensional projection images that can facilitate interpretable task-specific dimensionality reduction in accordance with one or more embodiments described herein. As shown, the system 400 can, in some cases, comprise the same components as the system 200, and can further comprise a set of 2D projection images 402.

In various embodiments, the projection component 114 can electronically generate the set of 2D projection images 402, based on the 3D weight map 204 and based on the set of projection vectors 206. Various non-limiting aspects are further described with respect to FIGS. 5-6.

Figure 5:
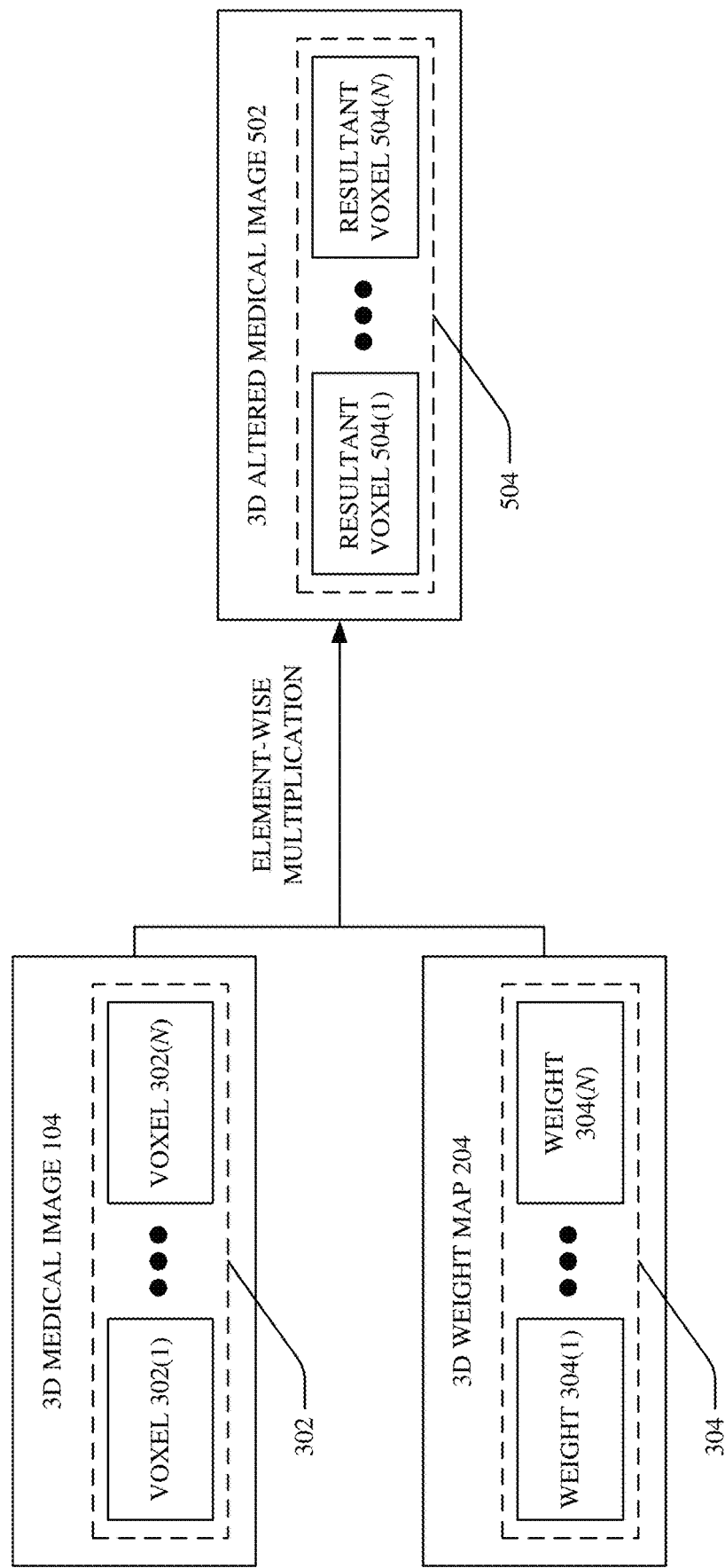
FIGS. 5-6 illustrate example, non-limiting block diagrams showing how a set of two-dimensional projection images can be generated in accordance with one or more embodiments described herein.
Figure 6:
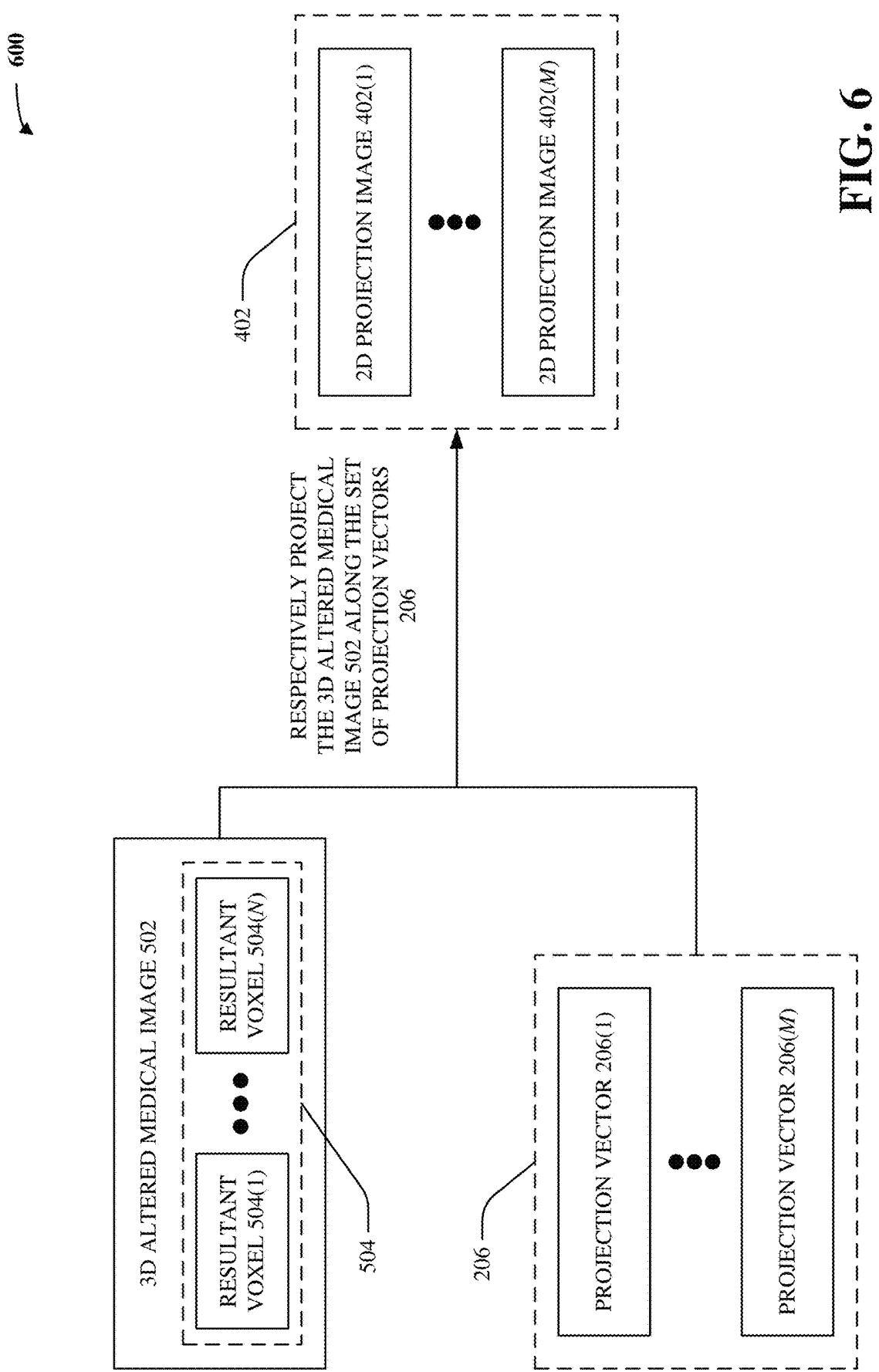

FIGS. 5-6 illustrate example, non-limiting block diagrams 500 and 600 showing how the set of 2D projection images 402 can be generated in accordance with one or more embodiments described herein.

First, consider FIG. 5. As shown, the projection component 114 can, in various aspects, electronically generate a 3D altered medical image 502, based on the 3D medical image 104 and based on the 3D weight map 204. In particular, the projection component 114 can electronically multiply, in element-wise fashion, the 3D medical image 104 with the 3D weight map 204, and the result of such element-wise multiplication can be the 3D altered medical image 502. More specifically, the projection component 114 can multiply each of the set of weights 304 by a respective one of the set of voxels 302, and such multiplication can yield a set of resultant voxels 504 that can be considered as making up the 3D altered medical image 502.

As a non-limiting example, and as mentioned above, the weight 304(1) can correspond to the voxel 302(1). Accordingly, the projection component 114 can multiply the weight 304(1) by the voxel 302(1), and the product of such multiplication can be a resultant voxel 504(1). Note that the resultant voxel 504(1) can be considered as being a multiplicatively scaled version of the voxel 302(1). In particular, if the deep learning neural network 202 infers that the voxel 302(1) is pertinent to the inferencing task, then the weight 304(1) can be equal to or otherwise near the maximum threshold value, and the resultant voxel 504(1) can thus be considered as having a same or up-scaled intensity as compared the voxel 302(1). On the other hand, if the deep learning neural network 202 instead infers that the voxel 302(1) is not pertinent to the inferencing task, then the weight 304(1) can be equal to or otherwise near its minimum threshold value, and the resultant voxel 504(1) can thus be considered as having a down-scaled intensity as compared to the voxel 302(1).

As another non-limiting example, and as mentioned above, the weight 304(n) can correspond to the voxel 302(n). Accordingly, the projection component 114 can multiply the weight 304(n) by the voxel 302(n), and the product of such multiplication can be a resultant voxel 504(n). As above, note that the resultant voxel 504(n) can be considered as being a multiplicatively scaled version of the voxel 302(n). For instance, if the deep learning neural network 202 infers that the voxel 302(n) is pertinent to the inferencing task, then the weight 304(n) can be equal to or otherwise near its maximum threshold value, and the resultant voxel 504(n) can thus be considered as having a same or up-scaled intensity as compared the voxel 302(n). On the other hand, if the deep learning neural network 202 instead infers that the voxel 302(n) is not pertinent to the inferencing task, then the weight 304(n) can be equal to or otherwise near its minimum threshold value, and the resultant voxel 504(n) can thus be considered as having a down-scaled intensity as compared to the voxel 302(n).

In any case, the resultant voxel 504(1) to the resultant voxel 504(n) can be considered as the set of resultant voxels 504, and the set of resultant voxels 504 can be considered as collectively forming the 3D altered medical image 502. In various aspects, because the 3D altered medical image 502 can be generated by element-wise multiplication between the 3D medical image 104 and the 3D weight map 204, the 3D altered medical image 502 can be considered as being a version of the 3D medical image 104 whose voxel intensities have been scaled up or scaled down, so as to emphasize voxels which the deep learning neural network 202 infers are pertinent to the inferencing task and so as to de-emphasize voxels which the deep learning neural network 202 infers are not pertinent to the inferencing task. In other words, the 3D altered medical image 502 can depict the same anatomical structure of the same medical patient as the 3D medical image 104, but the 3D altered medical image 502 can depict with higher intensities whichever portions of the anatomical structure the deep learning neural network 202 believes are pertinent to the inferencing task, and can depict with lower intensities whichever portions of the anatomical structure the deep learning neural network 202 believes are not pertinent to the inferencing task.

Now, consider FIG. 6. As shown, the projection component 114 can, in various aspects, electronically generate the set of 2D projection images 402, based on the 3D altered medical image 502 and based on the set of projection vectors 206. In particular, each of the set of 2D projection images 402 can be considered as the result of projecting the 3D altered medical image 502 along a respective one of the set of projection vectors 206. Accordingly, because the set of projection vectors 206 can comprise m vectors, the set of 2D projection images 402 can comprise m images: a 2D projection image 402(1) to a 2D projection image 402(m).

As a non-limiting example, the projection component 114 can project, via any suitable projection methodology such as MaxIP or MIP, the 3D altered medical image 502 along the unique three-dimensional direction defined by the projection vector 206(1), and the result can be the 2D projection image 402(1). In other words, the 2D projection image 402(1) can be considered as a two-dimensional view of the 3D altered medical image 502, which two-dimensional view is taken from the perspective of the projection vector 206(1).

As another non-limiting example, the projection component 114 can project, via any suitable projection methodology such as MaxIP or MIP, the 3D altered medical image 502 along the unique three-dimensional direction defined by the projection vector 206(m), and the result can be the 2D projection image 402(m). In other words, the 2D projection image 402(m) can be considered as a two-dimensional view of the 3D altered medical image 502, which two-dimensional view is taken from the perspective of the projection vector 206(m).

In any case, note that each of the set of 2D projection images 402 can be considered as a dimensionally-reduced representation of the 3D medical image 104 that is easily visually interpretable or understandable to a medical professional. Indeed, each of the set of 2D projection images 402 can be considered as a two-dimensional pixel array that illustrates a projected and intensity-scaled view of the anatomical structure depicted in the 3D medical image 104. Contrast this with a latent vector, which would instead be a black-box collection of numerical elements that carry no readily-interpretable meaning with respect to the anatomical structure depicted in the 3D medical image 104. Again, a latent vector is not a picture.

Furthermore, note that each of the set of 2D projection images 402 can be considered as a dimensionally-reduced representation of the 3D medical image 104 that can refrain from losing, hiding, or otherwise obscuring voxel content that is, in the opinion of the deep learning neural network 202, pertinent to the inferencing task. Indeed, element-wise multiplication of the 3D weight map 204 can cause whichever voxels that are more inferencing-task-pertinent (in the opinion of the deep learning neural network 202) to have higher intensities than whichever voxels that are less inferencing-task-pertinent. Accordingly, such voxels can be considered as being more easily visible from any projection direction. Moreover, projection along the set of projection vectors 206 can cause whichever voxels that are more inferencing-task-pertinent (in the opinion of the deep learning neural network 202) to be visibly unobstructed in the set of 2D projection images 402. Accordingly, the ultimate result can be that the set of 2D projection images 402 can be considered as not having lost or obscured inferencing-task-pertinent voxel content. Contrast this with existing analytical techniques, that generate two-dimensional projections which might hide, obscure, or not even show inferencing-task-pertinent voxel content.

In various embodiments, the display component 116 can electronically render, on any suitable electronic display (e.g., any suitable computer screen, any suitable computer monitor, any suitable graphical user-interface), any of the set of 2D projection images 402. Accordingly, a medical professional or technician that is attending to the medical patient whose anatomical structure is depicted in the 3D medical image 104 can visually inspect the set of 2D projection images 402 (e.g., for diagnosis or prognosis purposes). In various other aspects, the display component 116 can electronically transmit any of the set of 2D projection images 402 to any suitable computing device (not shown).

To help ensure that the 3D weight map 204 and the set of projection vectors 206 are accurate, the deep learning neural network 202 can first undergo training. Various non-limiting aspects of such training are described with respect to FIGS. 7-9.

Figure 7:
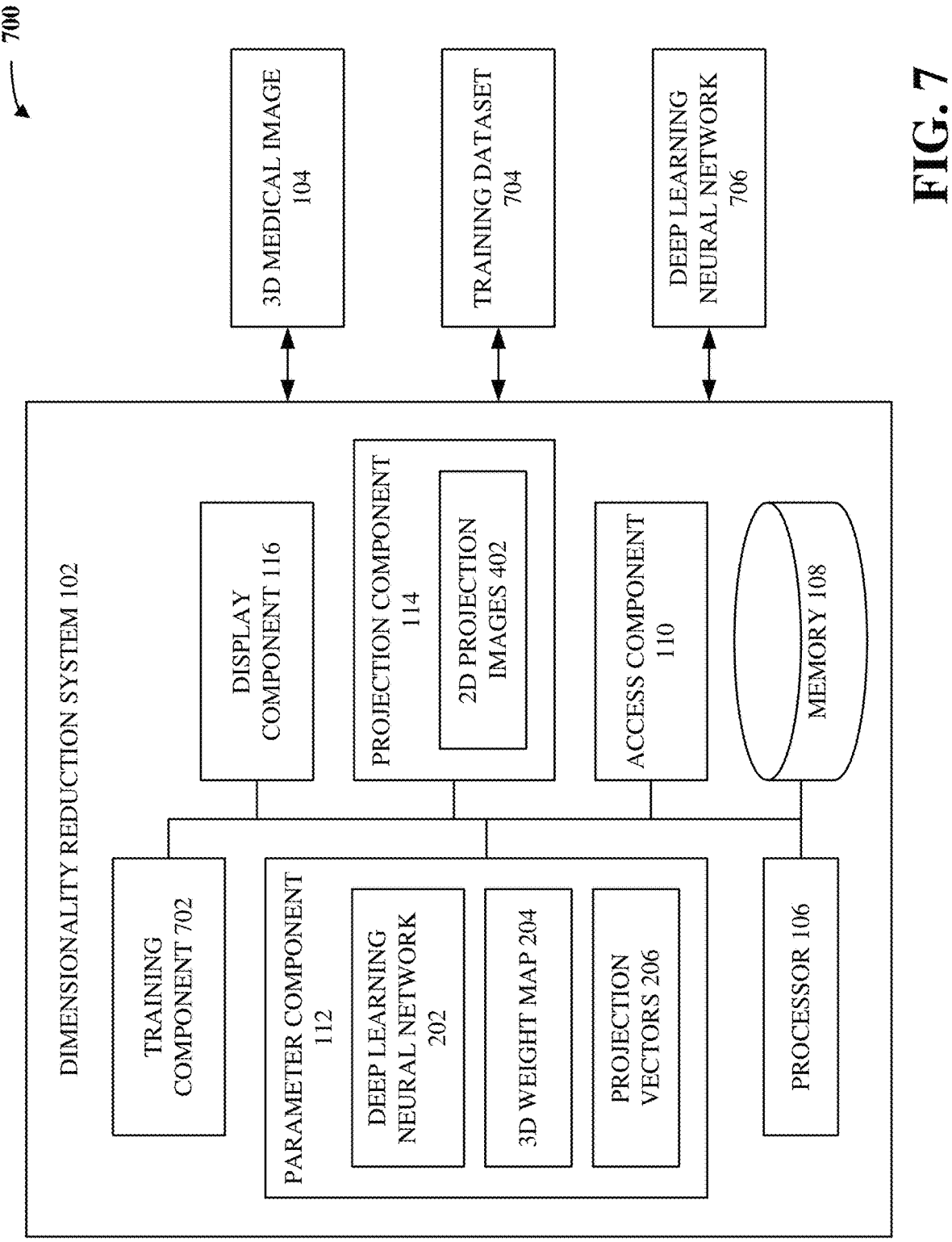
FIG. 7 illustrates a block diagram of an example, non-limiting system 700 including a training component, a training dataset, and a second deep learning neural network that facilitates interpretable task-specific dimensionality reduction in accordance with one or more embodiments described herein.

FIG. 7 illustrates a block diagram of an example, non-limiting system 700 including a training component, a training dataset, and a second deep learning neural network that can facilitate interpretable task-specific dimensionality reduction in accordance with one or more embodiments described herein. As shown, the system 700 can, in some cases, comprise the same components as the system 400, and can further comprise a training component 702, a training dataset 704, and a deep learning neural network 706.

In various embodiments, the access component 110 can electronically receive, retrieve, obtain, or otherwise access, from any suitable sources, the training dataset 704 and the deep learning neural network 706. In various aspects, the training component 702 can train the deep learning neural network 202 based on the training dataset 704 and based on the deep learning neural network 706. In some cases, the training dataset 704 can be annotated, and so the training component 702 can perform supervised training, as described with respect to FIGS. 8-9.

Figure 8:
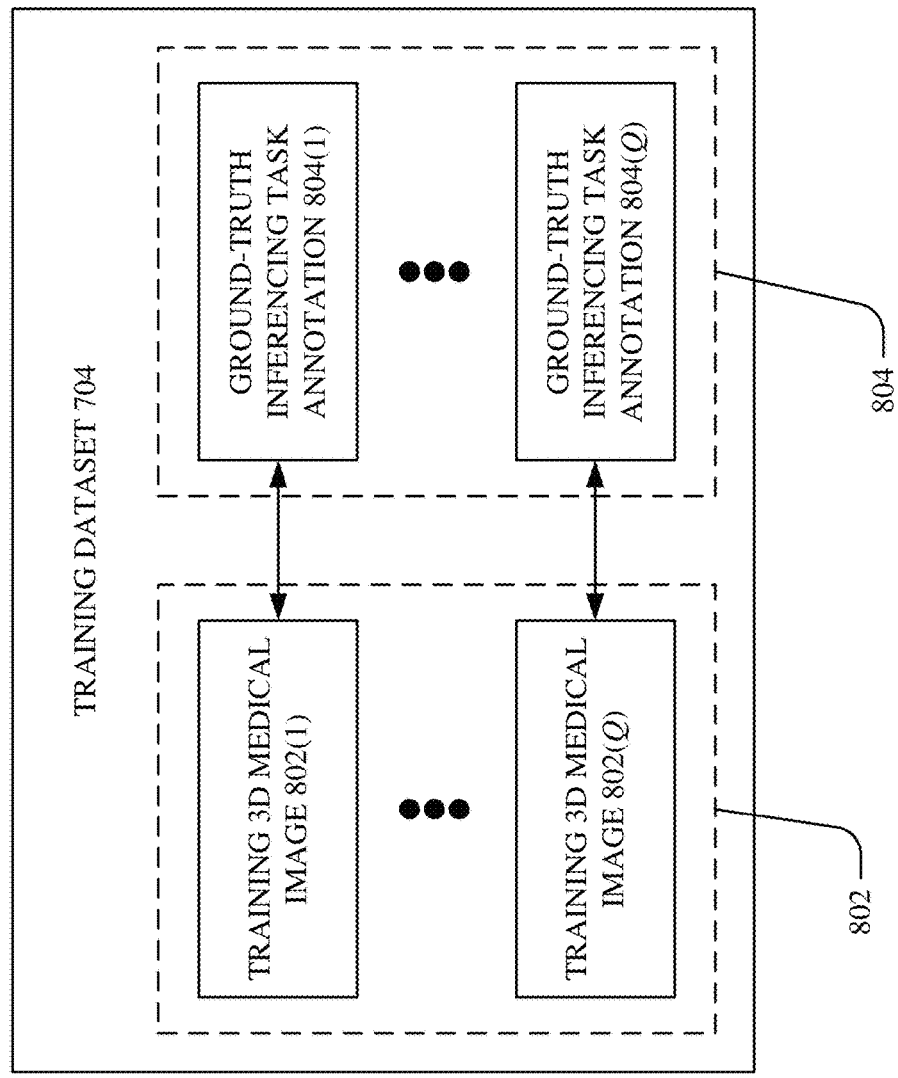
FIG. 8 illustrates an example, non-limiting block diagram of a training dataset in accordance with one or more embodiments described herein.

First, consider FIG. 8. FIG. 8 illustrates an example, non-limiting block diagram 800 of the training dataset 704 in accordance with one or more embodiments described herein. As shown, the training dataset 704 can, in various aspects, comprise a set of training 3D medical images 802. In various instances, the set of training 3D medical images 802 can comprise q images for any suitable positive integer q: a training 3D medical image 802(1) to a training 3D medical image 802(q). In various cases, a training 3D medical image can be any suitable three-dimensional voxel array having the same number or arrangement of voxels as the 3D medical image 104. In other words, because the 3D medical image 104 can have n voxels, each of the set of training 3D medical images 802 can likewise have n voxels. Moreover, because the 3D medical image 104 can depict the anatomical structure of the medical patient, each of the set of training 3D medical images 802 can likewise depict a respective anatomical structure of a respective medical patient.

As shown, the training dataset 704 can, in various instances, further comprise a set of ground-truth inferencing task annotations 804. In various cases, the set of ground-truth inferencing task annotations 804 can respectively correspond to the set of training 3D medical images 802. Thus, since the set of training 3D medical images 802 can have q images, the set of ground-truth inferencing task annotations 804 can have q annotations: a ground-truth inferencing task annotation 804(1) to a ground-truth inferencing task annotation 804(q). In various aspects, each of the set of ground-truth inferencing task annotations 804 can be any suitable electronic data that represents, indicates, or otherwise conveys a correct or accurate result that is known or deemed to be obtained when the inferencing task is properly performed on a respective one of the set of training 3D medical images 802. As a non-limiting example, the ground-truth inferencing task annotation 804(1) can correspond to the training 3D medical image 802(1). So, the ground-truth inferencing task annotation 804(1) can be considered as the correct or accurate result (e.g., the correct or accurate symptom classification label, the correct or accurate orientation determination result, the correct or accurate principal plane localization result, the correct or accurate landmark localization result, the correct or accurate display field of view determination result) that is known or otherwise deemed to be obtained if the inferencing task were properly performed on the training 3D medical image 802(1). As another non-limiting example, the ground-truth inferencing task annotation 804(q) can correspond to the training 3D medical image 802(q). Thus, the ground-truth inferencing task annotation 804(q) can be considered as the correct or accurate result (e.g., the correct or accurate symptom classification label, the correct or accurate orientation determination result, the correct or accurate principal plane localization result, the correct or accurate landmark localization result, the correct or accurate display field of view determination result) that is known or otherwise deemed to be obtained if the inferencing task were properly performed on the training 3D medical image 802(q).

In various aspects, the deep learning neural network 706 can have or otherwise exhibit any suitable internal architecture. For instance, the deep learning neural network 706 can have an input layer, one or more hidden layers, and an output layer. In various instances, any of such layers can be coupled together by any suitable interneuron connections or interlayer connections, such as forward connections, skip connections, or recurrent connections. Furthermore, in various cases, any of such layers can be any suitable types of neural network layers having any suitable learnable or trainable internal parameters. For example, any of such input layer, one or more hidden layers, or output layer can be convolutional layers, whose learnable or trainable parameters can be convolutional kernels. As another example, any of such input layer, one or more hidden layers, or output layer can be dense layers, whose learnable or trainable parameters can be weight matrices or bias values. As still another example, any of such input layer, one or more hidden layers, or output layer can be batch normalization layers, whose learnable or trainable parameters can be shift factors or scale factors. Further still, in various cases, any of such layers can be any suitable types of neural network layers having any suitable fixed or non-trainable internal parameters. For example, any of such input layer, one or more hidden layers, or output layer can be non-linearity layers, padding layers, pooling layers, or concatenation layers. In any case, the deep learning neural network 706 can be configured to receive as input m two-dimensional projection images and to perform the inferencing task (e.g., symptom classification, orientation determination, principal plane localization, landmark localization, display field of view determination) based on such m inputted two-dimensional projection images.

Figure 9:
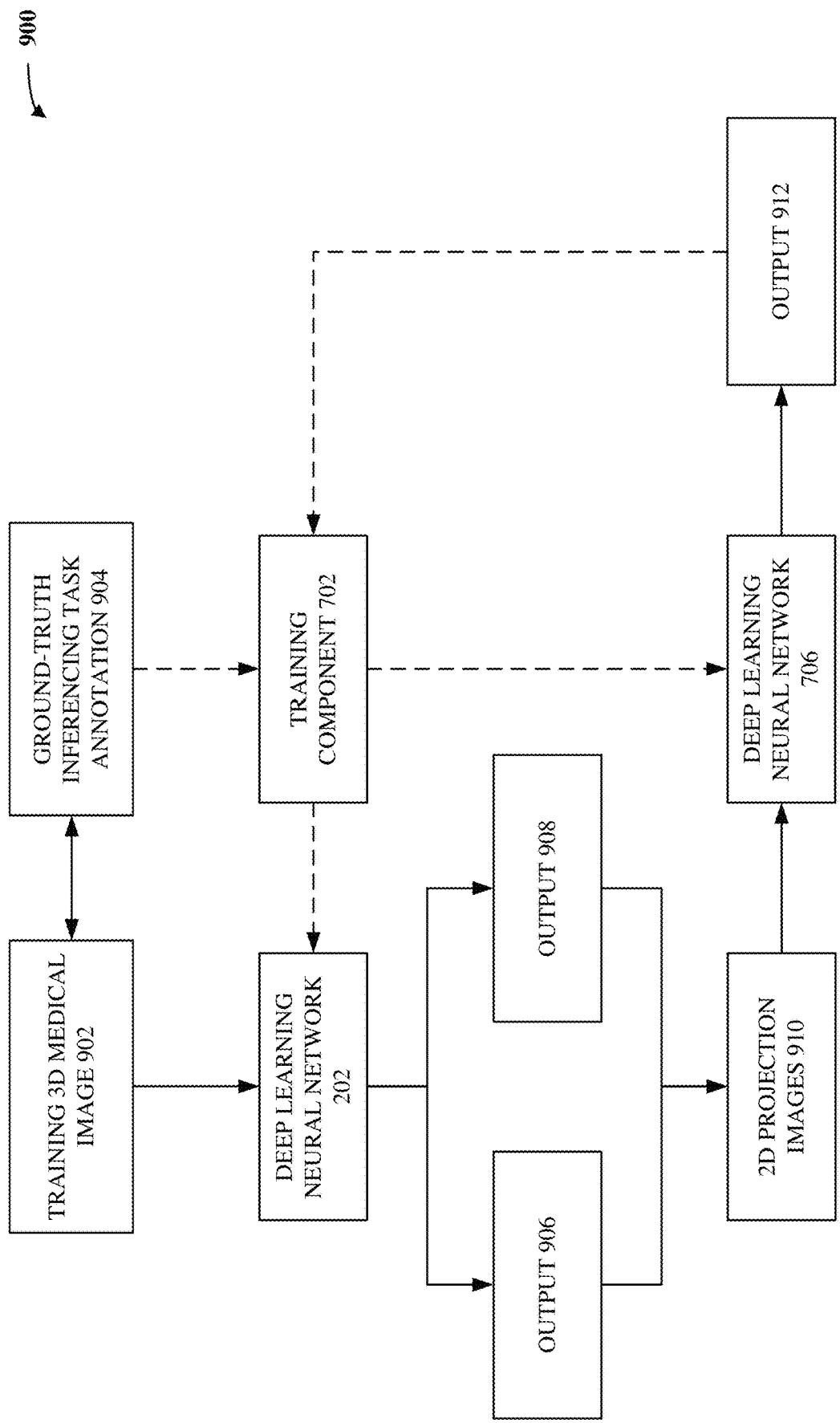
FIG. 9 illustrates an example, non-limiting block diagram showing how a deep learning neural network can be trained to facilitate interpretable task-specific dimensionality reduction in accordance with one or more embodiments described herein.

Now, consider FIG. 9. FIG. 9 illustrates an example, non-limiting block diagram 900 showing how the training component 702 can train the deep learning neural network 202 using the training dataset 704 and using the deep learning neural network 706.

In various aspects, the training component 702 can, prior to beginning such training, initialize in any suitable fashion (e.g., random initialization) the trainable internal parameters (e.g., convolutional kernels, weight matrices, bias values) of the deep learning neural network 202 and of the deep learning neural network 706.

In various instances, the training component 702 can select from the training dataset 704 a training 3D medical image 902 and a ground-truth inferencing task annotation 904 that corresponds to the training 3D medical image 902. In various cases, as shown, the training component 702 can execute the deep learning neural network 202 on the training 3D medical image 902, thereby causing the deep learning neural network 202 to produce an output 906 and an output 908. More specifically, the training component 702 can feed the training 3D medical image 902 to an input layer of the deep learning neural network 202, the training 3D medical image 902 can complete a forward pass through one or more hidden layers of the deep learning neural network 202, and an output layer of the deep learning neural network 202 can compute the output 906 and the output 908 based on activation maps generated by the one or more hidden layers of the deep learning neural network 202.

Note that, in various cases, the sizes or formats of the output 906 and of the output 908 can be controlled or otherwise determined by the number or arrangement of neurons (or by the characteristics of other internal parameters such as convolutional kernels) that are in the output layer of the deep learning neural network 202. That is, the output 906 and the output 908 can be forced to have desired sizes or formats (e.g., desired numbers or arrangements of numerical elements), by controllably adding or removing neurons (or other internal parameters such as convolutional kernels) to or from the output layer of the deep learning neural network 202.

In various aspects, the output 906 can be considered as the predicted or inferred three-dimensional weight map (e.g., also called voxel-wise weight map) that the deep learning neural network 202 believes should correspond to the training 3D medical image 902. Accordingly, the output 906 can have the same size or format as the 3D weight map 204. Similarly, in various instances, the output 908 can be considered as the m predicted or inferred projection vectors that the deep learning neural network 202 believes should correspond to the training 3D medical image 902. Thus, the output 908 can have the same size or format as the set of projection vectors 206. Note that, if the deep learning neural network 202 has so far undergone no or little training, then the output 906 and the output 908 can be highly inaccurate (e.g., the output 906 might erroneously assign lower weights to voxels of the training 3D medical image 902 that are actually more pertinent to the inferencing task; the output 908 might mistakenly define m directions along which such task-pertinent voxels are actually more obscured or less visible).

In various cases, the training component 702 can generate a set of 2D projection images 910, based on the output 906 and based on the output 908. In various aspects, the set of 2D projection images 910 can be analogous to the set of 2D projection images 402. Accordingly, because set of 2D projection images 402 can comprise m images, the set of 2D projection images 910 can likewise comprise m images. More specifically, the training component 702 can multiply, in element-wise fashion, the output 906 by the training 3D medical image 902. Such element-wise multiplication can yield an altered training 3D medical image (not shown). Furthermore, the training component 702 can project (e.g., via MaxIP or MIP) such altered training 3D medical image along each of the m projection vectors indicated by the output 908, and the result of such projection can be the set of 2D projection images 910. Again, note that, if the deep learning neural network 202 has so far undergone no or little training, then the 2D projection images 910 can be highly inaccurate (e.g., can fail to be dimensionally-reduced representations of the training 3D medical image 902 that are easily visually interpretable and that have not lost or obscured voxel content that is actually pertinent to the inferencing task).

In various aspects, as shown, the training component 702 can execute the deep learning neural network 706 on the set of 2D projection images 910, thereby causing the deep learning neural network 706 to produce an output 912. More specifically, the training component 702 can feed the set of 2D projection images 910 to an input layer of the deep learning neural network 706, the set of 2D projection images 910 can complete a forward pass through one or more hidden layers of the deep learning neural network 706, and an output layer of the deep learning neural network 706 can compute the output 912 based on activation maps generated by the one or more hidden layers of the deep learning neural network 706.

As above, note that, in various cases, the size or format of the output 912 can be controlled or otherwise determined by the number or arrangement of neurons (or by the characteristics of other internal parameters such as convolutional kernels) that are in the output layer of the deep learning neural network 706. That is, the output 912 can be forced to have a desired size or format (e.g., desired number or arrangement of numerical elements), by controllably adding or removing neurons (or other internal parameters such as convolutional kernels) to or from the output layer of the deep learning neural network 706.

In various aspects, the output 912 can be considered as the predicted or inferred inferencing task result (e.g., predicted or inferred symptom classification label; predicted or inferred orientation determination result; predicted or inferred principal plane localization result; predicted or inferred landmark localization result; predicted or inferred display field of view determination result) that the deep learning neural network 706 believes should correspond to the set of 2D projection images 910. In contrast, the ground-truth inferencing task annotation 904 can be considered as the correct or accurate inferencing task result (e.g., correct or accurate symptom classification label; correct or accurate orientation determination result; correct or accurate principal plane localization result; correct or accurate landmark localization result; correct or accurate display field of view determination result) that is known or otherwise deemed to correspond to the training 3D medical image 902.

Note that, in various aspects, the output 912 and the ground-truth inferencing task annotation 904 can have the same size, format, or dimensionality as each other. As a non-limiting example, suppose that the inferencing task is image classification. In such case, the output 912 can be a scalar classification label that the deep learning neural network 706 predicts should correspond to the set of 2D projection images 910. Moreover, in such case, the ground-truth inferencing task annotation 904 can likewise be a scalar classification label that is known or otherwise deemed to correspond to the training 3D medical image 902.

However, note that, in various other aspects, the output 912 can have a different size, format, or dimensionality than the ground-truth inferencing task annotation 904. In such case, the training component 702 can project the ground-truth inferencing task annotation 904 along each of the projection vectors indicated by the output 908, thereby yielding a set of projected ground-truth inferencing task annotations (not shown), where such set of projected ground-truth inferencing task annotations can be considered as having the same size, format, or dimensionality as the output 912. As a non-limiting example, suppose that the inferencing task is image segmentation. In such case, the output 912 can be a set of m two-dimensional segmentation masks: one two-dimensional segmentation mask per each of the set of 2D projection images 910. In contrast, the ground-truth inferencing task annotation 904 can instead be a single three-dimensional segmentation mask that is known or otherwise deemed to correspond to the training three-dimensional medical image 902. In such case, the training component 702 can project that single three-dimensional segmentation mask along each of the m projection vectors indicated by the output 908, thereby yielding a set of m two-dimensional ground-truth segmentation masks. Such m two-dimensional ground-truth segmentation masks can be considered as now having the same size, format, or dimensionality as the m two-dimensional segmentation masks indicated by the output 912.

In cases where the output 912 already has the same size, format, or dimensionality as the ground-truth inferencing task output 904, the training component 702 can compute at least one error or loss (e.g., MAE, MSE, cross-entropy) between the output 912 and the ground-truth inferencing task annotation 904. Instead, in cases where the output 912 does not have the same size, format, or dimensionality as the ground-truth inferencing task annotation 904, the training component 702 can project the ground-truth inferencing task annotation 904 along each of the m projection vectors indicated by the output 908, thereby yielding the set of projected ground-truth inferencing task annotations as mentioned above, and the training component 702 can compute at least one error or loss (e.g., MAE, MSE, cross-entropy) between the output 912 and that set of projected ground-truth inferencing task annotations. In any case, the training component 702 can compute at least one error or loss based on the output 912 and based on the ground-truth inference task annotation 904, and the training component 702 can incrementally update, via backpropagation, the trainable internal parameters of the deep learning neural network 202 or of the deep learning neural network 706, based on such at least one computed error or loss. Note that, in some instances, the training component 702 can perform such backpropagation first on the deep learning neural network 706 and then (e.g., subsequently) on the deep learning neural network 202.

In various cases, the training component 702 can repeat such execution and update procedure for each training 3D medical image in the training dataset 704. This can ultimately cause the trainable internal parameters of the deep learning neural network 202 to become iteratively optimized for accurately generating weight maps and projection vectors for inputted three-dimensional medical images, and can also ultimately cause the trainable internal parameters of the deep learning neural network 706 to become iteratively optimized for accurately performing the inferencing task on inputted sets of two-dimensional projection images. More specifically, such training can cause the computed error/loss between the output 912 and the ground-truth inferencing task annotation 904 to become iteratively smaller. As such computed error/loss becomes iteratively smaller, the deep learning neural network 706 can be considered as learning how to better or more correctly perform the inferencing task on the set of 2D projection images 910. However, because the set of 2D projection images 910 can be based on the output 906 and the output 908, such training can commensurately cause the deep learning neural network 202 to learn how to better or more accurately produce the output 906 and the output 908. In other words, such training can cause the deep learning neural network 202 to learn how to produce the output 906 (e.g., the inferred/predicted weight map) and the output 908 (e.g., the inferred/predicted projection vectors) so as to minimize or otherwise reduce the computed error/loss between the output 912 and the ground-truth inferencing task annotation 904. In still other words, as the computed error/loss between the output 912 and the ground-truth inferencing task annotation 904 shrinks over successive training iterations or epochs, the output 906 can become better at assigning heavier weights to voxels that are dispositive or pertinent with respect to the inferencing task, and the output 908 can become better as defining directions along which such dispositive or pertinent voxels are well-visible or not obscured. In various cases, such training setup can be considered as a serial pipeline in which the deep learning neural network 202 is upstream of the deep learning neural network 706.

In various aspects, the training component 702 can implement any suitable training batch sizes, any suitable training termination criteria, or any suitable error/loss functions.

Although not explicitly shown in the figures, the projection component 114 can, in various embodiments, electronically execute the deep learning neural network 706 on the set of 2D projection images 402, thereby yielding a predicted or inferred inferencing task result (e.g., a predicted/inferred symptom classification label, a predicted/inferred orientation determination result, a predicted/inferred principal plane localization result, a predicted/inferred landmark localization result, a predicted/inferred display field of view determination result) that corresponds to the 3D medical image 104. In various aspects, the display component 116 can electronically render such predicted or inferred inferencing task result on the electronic display. In various other aspects, the display component 116 can electronically transmit such predicted or inferred inferencing task result to any other suitable computing device.

Figure 10:
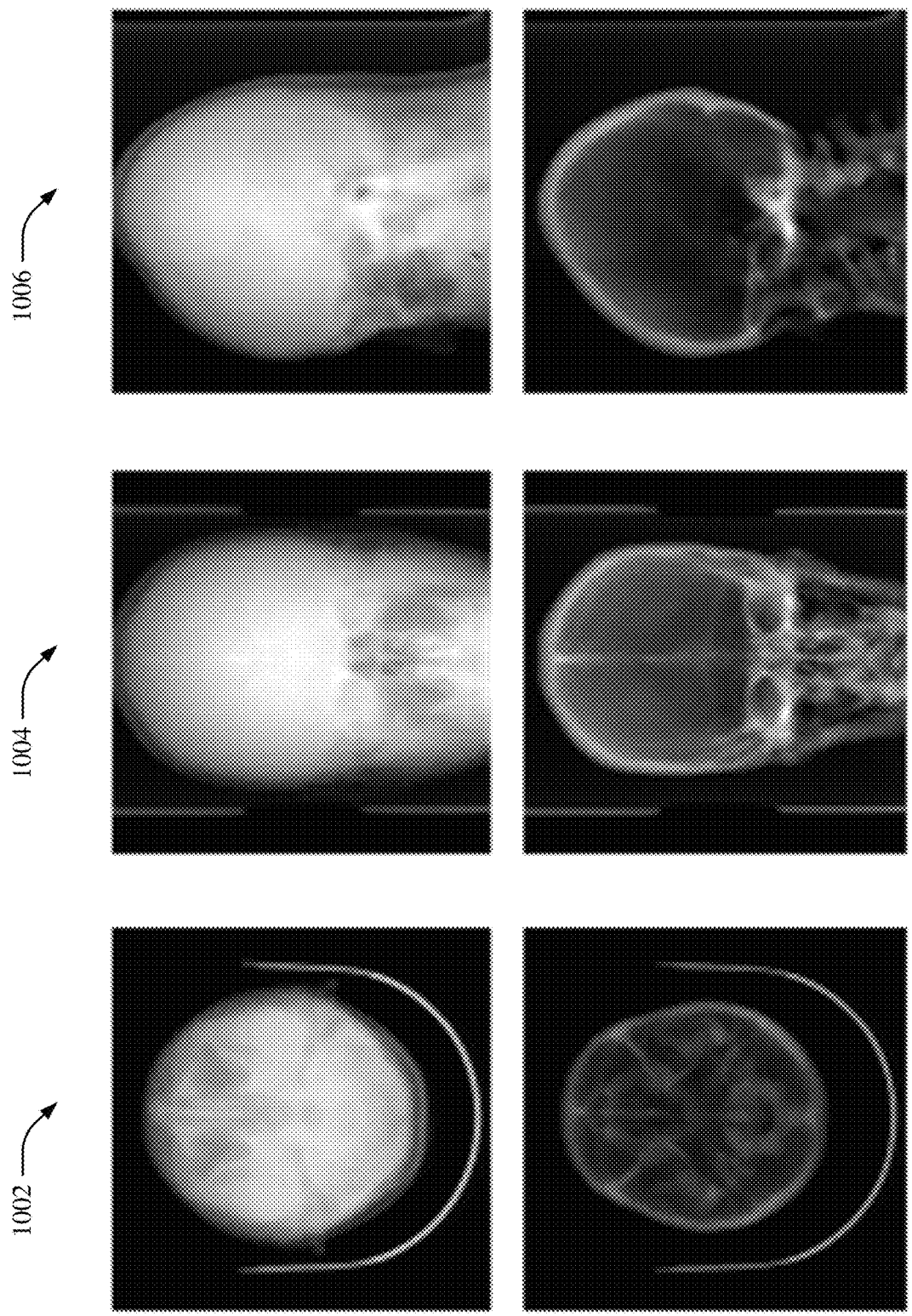
FIGS. 10-12 illustrate example, non-limiting experimental results in accordance with one or more embodiments described herein.
Figure 11:
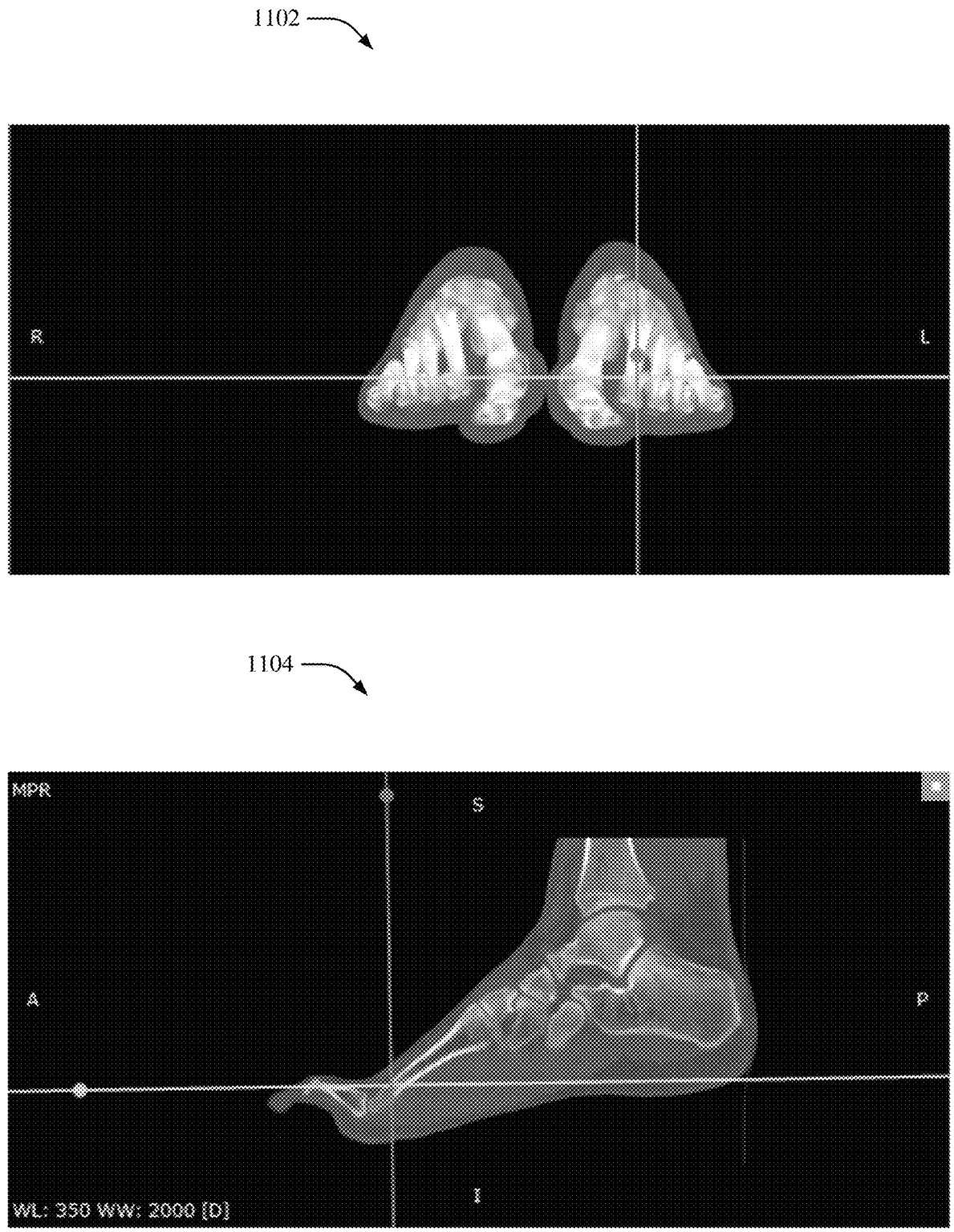
Figure 12:
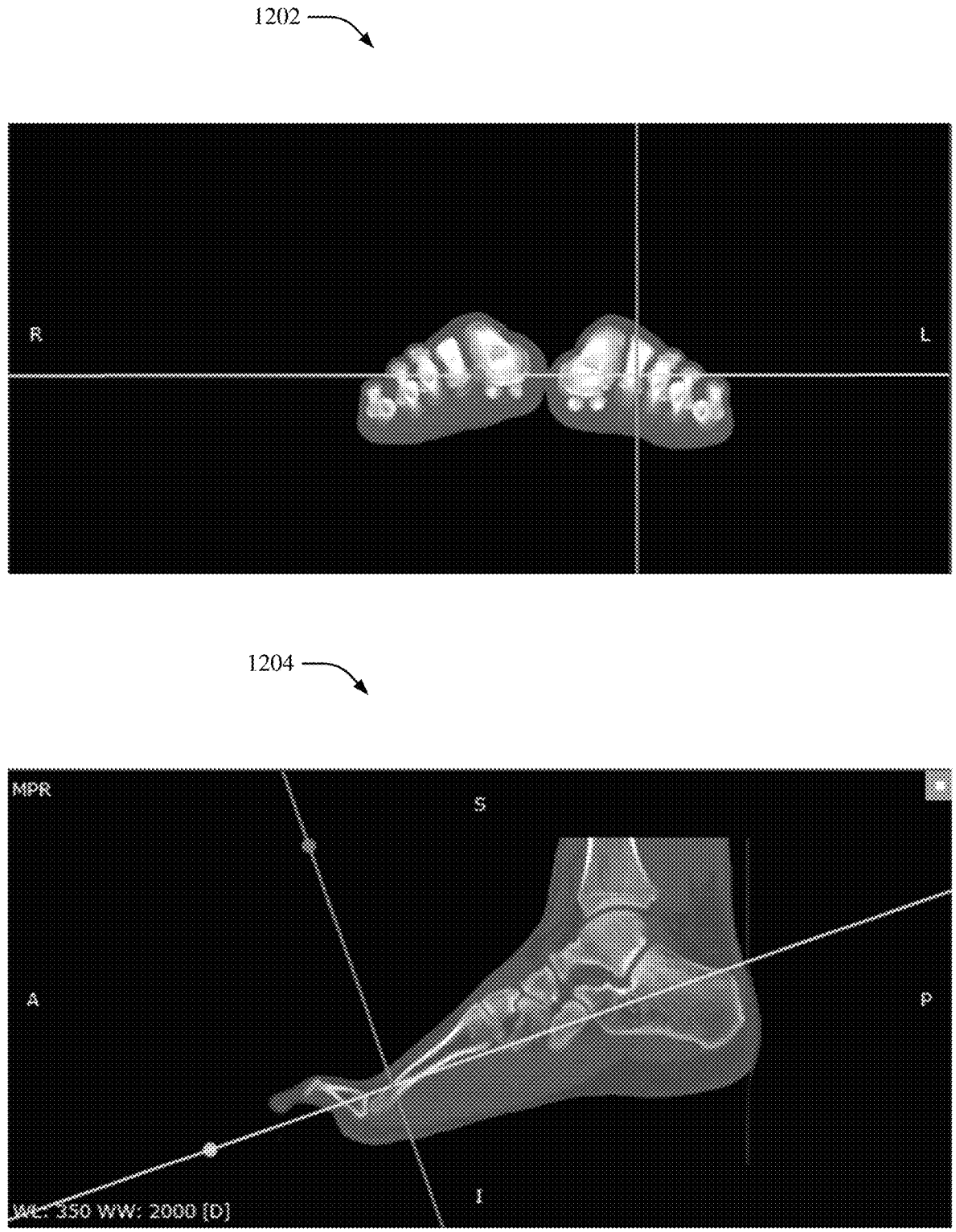

FIGS. 10-12 illustrate example, non-limiting experimental results in accordance with one or more embodiments described herein.

First, consider FIG. 10. A three-dimensional voxel array depicting a skull of a medical patient was obtained. It was desired to perform orientation correction (an inferencing task) on dimensionally-reduced representations of such voxel array. Some dimensionally-reduced representations were generated via existing analytical techniques, whereas other dimensionally-reduced representations were generated via embodiments described herein. Such dimensionally-reduced representations are shown in FIG. 10.

As shown, FIG. 10 illustrates an axial MIP projection 1002 of the three-dimensional voxel array, a coronal MIP projection 1004 of the three-dimensional voxel array, and a sagittal MIP projection 1006 of the three-dimensional voxel array. All three of such projections can be considered as having been generated via existing analytical techniques.

As also shown, FIG. 10 illustrates an axial task-specific projection 1008, a coronal task-specific projection 1010, and a sagittal task-specific projection 1012. Such projections were generated by a non-limiting embodiment of the dimensionality reduction system 102 where m=3. As shown, the non-limiting embodiment of the dimensionality reduction system 102 inferred that the axial, coronal, and sagittal directions were the best for viewing whichever voxels of the three-dimensional voxel array were most pertinent for performance of orientation correction. Moreover, as shown, the non-limiting embodiment of the dimensionality reduction system 102 also preserved the intensities of whichever voxels it believed were most pertinent for performance of orientation correction and scaled-down the intensities of whichever voxels it believed were less pertinent for performance of orientation correction. As shown, the ultimate result is that the substantive image content (e.g., skull features) that is most pertinent to performance of orientation correction is visually emphasized or otherwise easily visible in the axial task-specific projection 1008, in the coronal task-specific projection 1010, and in the sagittal task-specific projection 1012 (e.g., such projections emphasize the outline and base of the skull; the coronal task-specific projection also emphasizes the cranial line of sagittal symmetry running vertically down the center of the skull). In contrast, such substantive image content is not visually emphasized or otherwise easily visible in the axial MIP projection 1002, in the coronal MIP projection 1004, or in the sagittal MIP projection 1006.

Now, consider FIGS. 11-12. A three-dimensional voxel array depicting the feet of a medical patient was obtained. It was desired to perform orientation correction (an inferencing task) on dimensionally-reduced representations of such voxel array. Some dimensionally-reduced representations were generated via existing analytical techniques, whereas other dimensionally-reduced representations were generated via embodiments described herein. Such dimensionally-reduced representations are shown in FIGS. 11-12.

As shown, FIG. 11 illustrates a coronal MIP projection 1102 of the three-dimensional voxel array. This can be considered having been generated by existing analytical techniques. Indeed, FIG. 11 shows a side-view 1104 of the three-dimensional voxel array, where the side-view 1104 is annotated to call-out the projection plane (e.g., vertical line in 1104) and the projection direction (e.g., horizontal line in 1104) along which the coronal MIP projection 1102 was formed.

Now, consider FIG. 12. As shown, FIG. 12 illustrates an oblique task-specific projection 1202 of that same three-dimensional voxel array. Such projection was generated by a non-limiting embodiment of the dimensionality reduction system 102 where m=1. Moreover, FIG. 12 shows a side-view 1204 of the three-dimensional voxel array, where the side-view 1204 is annotated to call-out the projection plane (e.g., line in 1204 that moves steeply downward from left to right) and the projection direction (e.g., line in 1204 that moves shallowly upward from left to right) along which the oblique task-specific projection 1202 was formed.

As shown, the non-limiting embodiment of the dimensionality reduction system 102 inferred that a particular oblique (e.g., non-axial, non-coronal, and non-sagittal) direction was the best for viewing whichever voxels of the three-dimensional voxel array were most pertinent for performance of orientation correction. Indeed, the five toes of each foot can be easily visually seen in the oblique task-specific projection 1202. In contrast, the five toes of each foot are partially overlapping each other in the coronal MIP projection 1102. Furthermore, as shown, the non-limiting embodiment of the dimensionality reduction system 102 also preserved the intensities of whichever voxels it believed were most pertinent for performance of orientation correction and scaled-down the intensities of whichever voxels it believed were less pertinent for performance of orientation correction. As shown, the ultimate result is that the substantive image content that is most pertinent to performance of orientation correction (e.g., the toes) is visually emphasized or otherwise easily visible and unobstructed in the oblique task-specific projection 1202, whereas the substantive image content that is less pertinent to performance of orientation correction (e.g., the metatarsals and ankles) is visually de-emphasized in the oblique task-specific projection 1202. In contrast, the substantive image content that is most pertinent to orientation correction (e.g., the toes) is partially obstructed in the coronal MIP projection 1102, and the substantive image content that is less pertinent to orientation correction (e.g., the metatarsals and ankles) is cluttering the coronal MIP projection 1102.

Figure 13:
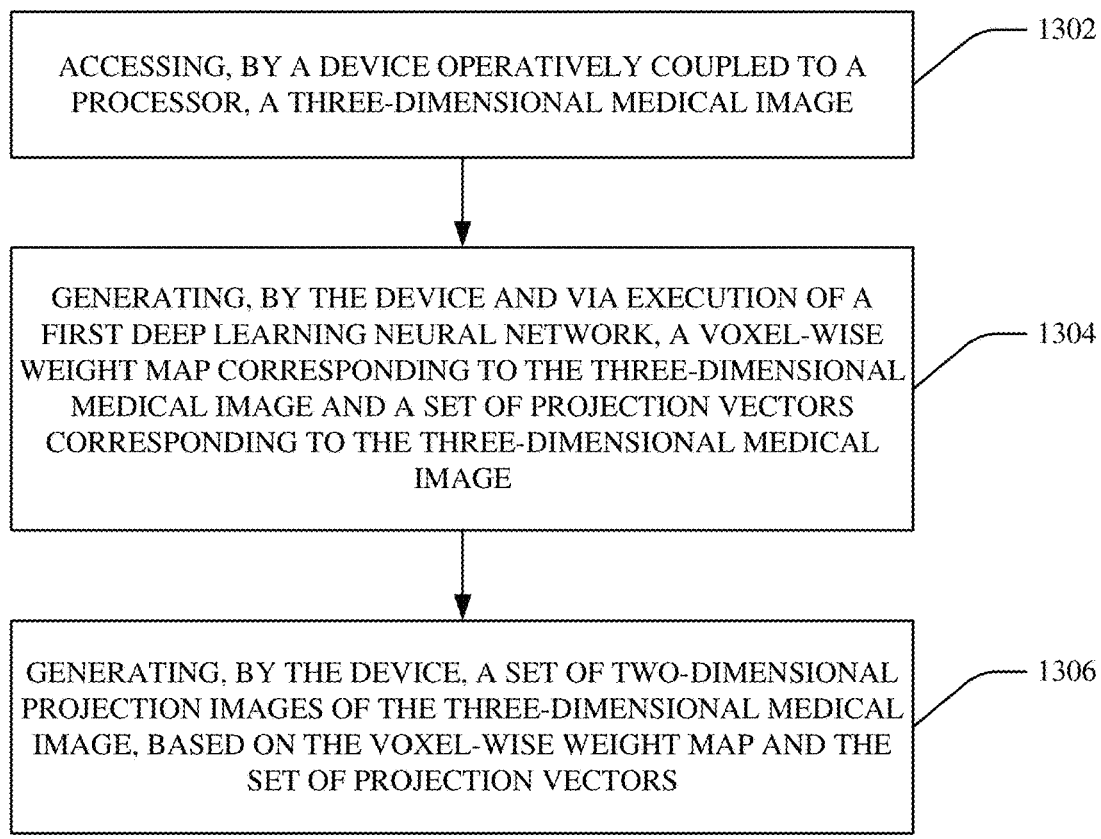
FIG. 13 illustrates a flow diagram of an example, non-limiting computer-implemented method that facilitates interpretable task-specific dimensionality reduction in accordance with one or more embodiments described herein.

FIG. 13 illustrates a flow diagram of an example, non-limiting computer-implemented method 1300 that can facilitate interpretable task-specific dimensionality reduction in accordance with one or more embodiments described herein. In various cases, the dimensionality reduction system 102 can facilitate the computer-implemented method 1300.

In various embodiments, act 1302 can include accessing, by a device (e.g., via 110) operatively coupled to a processor, a three-dimensional medical image (e.g., 104, or 902).

In various aspects, act 1304 can include generating, by the device (e.g., via 112) and via execution of a first deep learning neural network (e.g., 202), a voxel-wise weight map (e.g., 204, or 906) corresponding to the three-dimensional medical image and a set of projection vectors (e.g., 206, or 908) corresponding to the three-dimensional medical image.

In various instances, act 1306 can include generating, by the device (e.g., via 114), a set of two-dimensional projection images (e.g., 402, or 910) of the three-dimensional medical image, based on the voxel-wise weight map and the set of projection vectors.

Although not explicitly shown in FIG. 13, the first deep learning neural network (e.g., 202) can be trained in a serial pipeline with a second deep learning neural network (e.g., 706) that is configured to perform an inferencing task on two-dimensional inputs. This can cause the set of two-dimensional projection images (e.g., 402) to be tailored to or otherwise specific to the inferencing task (e.g., this can cause the set of two-dimensional projection images to not lose or obscure substantive voxel content that is pertinent or relevant to the inferencing task).

Although not explicitly shown in FIG. 13, the computer-implemented method 1300 can comprise: executing, by the device (e.g., via 702), the second deep learning neural network (e.g., 706) on the set of two-dimensional projection images (e.g., 910), thereby yielding an inferencing task output (e.g., 912).

Although not explicitly shown in FIG. 13, the computer-implemented method 1300 can comprise: updating, by the device (e.g., via 702), internal parameters of the first deep learning neural network (e.g., 202) based on an error between the inferencing task output (e.g., 912) and a ground-truth annotation (e.g., 904) corresponding to the three-dimensional medical image (e.g., 902), or between the inferencing task output and a projection of the ground-truth annotation (e.g., 904 can be projected along the m projection vectors indicated by 908).

Although not explicitly shown in FIG. 13, the computer-implemented method 1300 can comprise: updating, by the device (e.g., via 702), internal parameters of the second deep learning neural network (e.g., 706) based on the error between the inferencing task output (e.g., 912) and the ground-truth annotation (e.g., 904) corresponding to the three-dimensional medical image (e.g., 902), or between the inferencing task output and a projection of the ground-truth annotation (e.g., 904 can be projected along the m projection vectors indicated by 908).

Although not explicitly shown in FIG. 13, the generating the set of two-dimensional projection images can comprise: multiplying, by the device (e.g., via 114) and in element-wise fashion, the voxel-wise weight map (e.g., 204) with the three-dimensional medical image (e.g., 104), thereby yielding an altered three-dimensional medical image (e.g., 502); and projecting, by the device (e.g., via 114), the altered three-dimensional medical image along the set of projection vectors (e.g., 206).

Although not explicitly shown in FIG. 13, the computer-implemented method 1300 can comprise: rendering, by the device (e.g., via 116), the set of two-dimensional projection images (e.g., 402) on an electronic display.

Although not explicitly shown in FIG. 13, the set of two-dimensional projection images can include an oblique projection (e.g., a non-sagittal, non-coronal, and non-axial projection).

Various embodiments described herein can include a computer program product for facilitating interpretable task-specific dimensionality reduction. In various embodiments, the computer program product can comprise a non-transitory computer-readable memory (e.g., 108) having program instructions embodied therewith. In various aspects, the program instructions can be executable by a processor (e.g., 106) to cause the processor to access a voxel array (e.g., 104). In various instances, the program instructions can be further executable to cause the processor to execute a first deep learning neural network (e.g., 202) on the voxel array, thereby yielding a voxel-wise weight map (e.g., 204) and at least one projection vector (e.g., 206). In various cases, the program instructions can be further executable to cause the processor to multiply, in element-wise fashion, the voxel array by the voxel-wise weight map, thereby yielding an altered voxel array (e.g., 504). In various aspects, the program instructions can be further executable to cause the processor to project the altered voxel array along the at least one projection vector, thereby yielding at least one projected pixel array (e.g., 402). In various instances, the program instructions can be further executable to cause the processor to render the at least one projected pixel array on an electronic display. In various cases, the first deep learning neural network can be trained in a serial pipeline with a second deep learning neural network (e.g., 706) that is configured to perform an inferencing task on two-dimensional inputs, such that the at least one projected pixel array is specific to the inferencing task.

Although the herein disclosure mainly describes various embodiments as applying to a deep learning neural network (e.g., 202 or 706), this is a mere non-limiting example. In various aspects, the herein-described teachings can be applied to any suitable machine learning models exhibiting any suitable artificial intelligence architectures (e.g., support vector machines, naïve Bayes, linear regression, logistic regression, decision trees, random forest).

Although the herein disclosure mainly describes various embodiments as facilitating dimensionality-reduction of a three-dimensional medical image (e.g., 104), this is a mere non-limiting example. In various aspects, the herein-described dimensionality-reduction teachings can be applied to any suitable electronic data (e.g., even non-medical data or non-imaging data) having any suitable dimensionality (e.g., having more than three dimensions).

In various instances, machine learning algorithms or models can be implemented in any suitable way to facilitate any suitable aspects described herein. To facilitate some of the above-described machine learning aspects of various embodiments, consider the following discussion of artificial intelligence (AI). Various embodiments described herein can employ artificial intelligence to facilitate automating one or more features or functionalities. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system or environment from a set of observations as captured via events or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events or data.

Such determinations can result in the construction of new events or actions from a set of observed events or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes or systems (e.g., support vector machines, neural networks, expert systems, Bayesian belief networks, fuzzy logic, data fusion engines, and so on) in connection with performing automatic or determined action in connection with the claimed subject matter. Thus, classification schemes or systems can be used to automatically learn and perform a number of functions, actions, or determinations.

A classifier can map an input attribute vector, $z=(z_1, z_2, z_3, z_4, z_n)$, to a confidence that the input belongs to a class, as by f(z)=confidence(class). Such classification can employ a probabilistic or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, or probabilistic classification models providing different patterns of independence, any of which can be employed. Classification as used herein also is inclusive of statistical regression that is utilized to develop models of priority.

The herein disclosure describes non-limiting examples. For case of description or explanation, various portions of the herein disclosure utilize the term "each," "every," or "all" when discussing various examples. Such usages of the term "each," "every," or "all" are non-limiting. In other words, when the herein disclosure provides a description that is applied to "each," "every," or "all" of some particular object or component, it should be understood that this is a non-limiting example, and it should be further understood that, in various other examples, it can be the case that such description applies to fewer than "each," "every," or "all" of that particular object or component.

Figure 14:
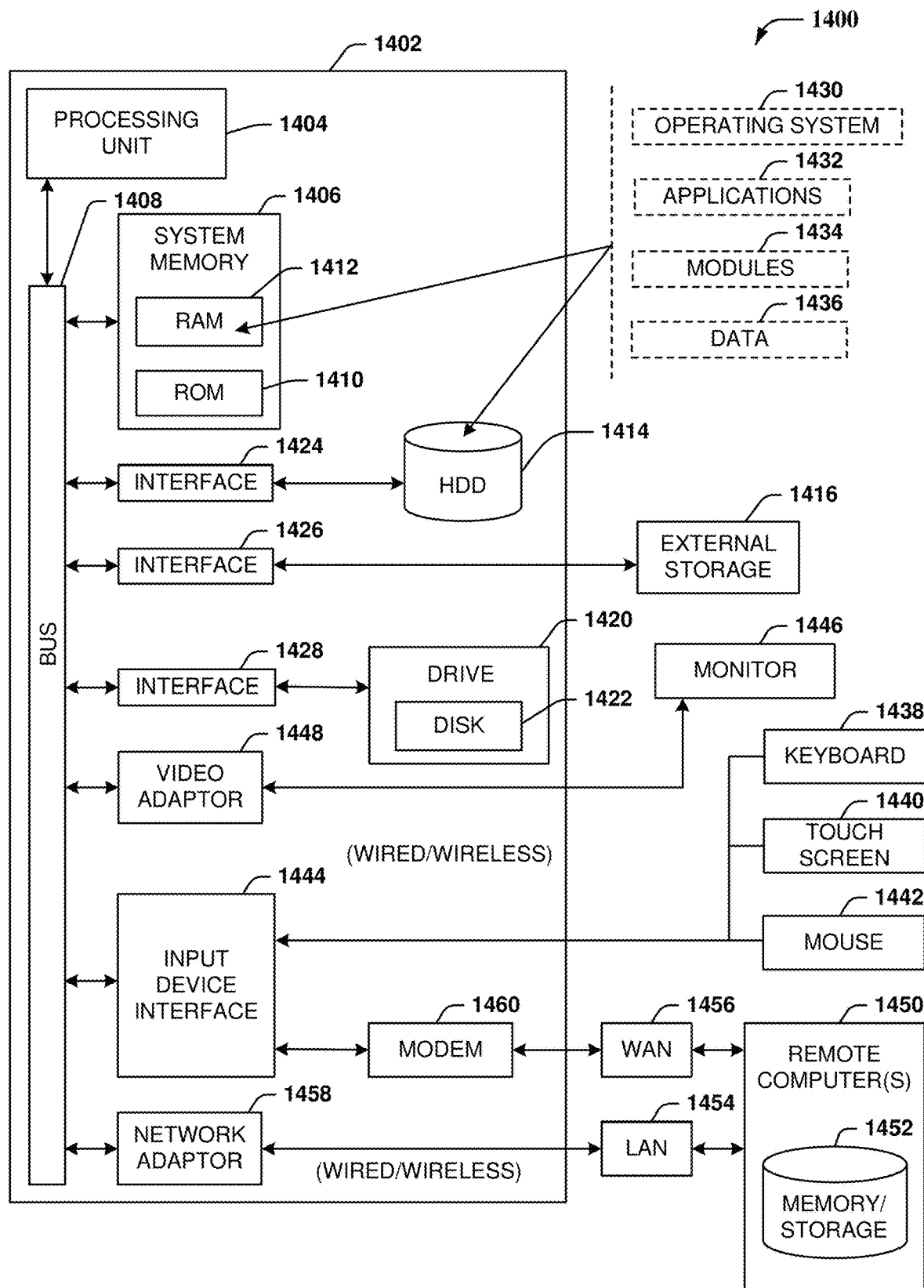
FIG. 14 illustrates a block diagram of an example, non-limiting operating environment in which one or more embodiments described herein can be facilitated.

In order to provide additional context for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IOT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and a drive 1420, e.g., such as a solid state drive, an optical disk drive, which can read or write from a disk 1422, such as a CD-ROM disc, a DVD, a BD, etc. Alternatively, where a solid state drive is involved, disk 1422 would not be included, unless separate. While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414. The HDD 1414, external storage device(s) 1416 and drive 1420 can be connected to the system bus 1408 by an HDD interface 1424, an external storage interface 1426 and a drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enable with a security module, such as a trusted processing module (TPM). For instance with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 or larger networks, e.g., a wide area network (WAN) 1456. Such LAN and WAN networking environments are commonplace in offices and companies, and facilitate enterprisewide computer networks, such as intranets, all of which can connect to a global communications network, e.g., the Internet.

When used in a LAN networking environment, the computer 1402 can be connected to the local network 1454 through a wired or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above, such as but not limited to a network virtual machine providing one or more aspects of storage or processing of information. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 15:
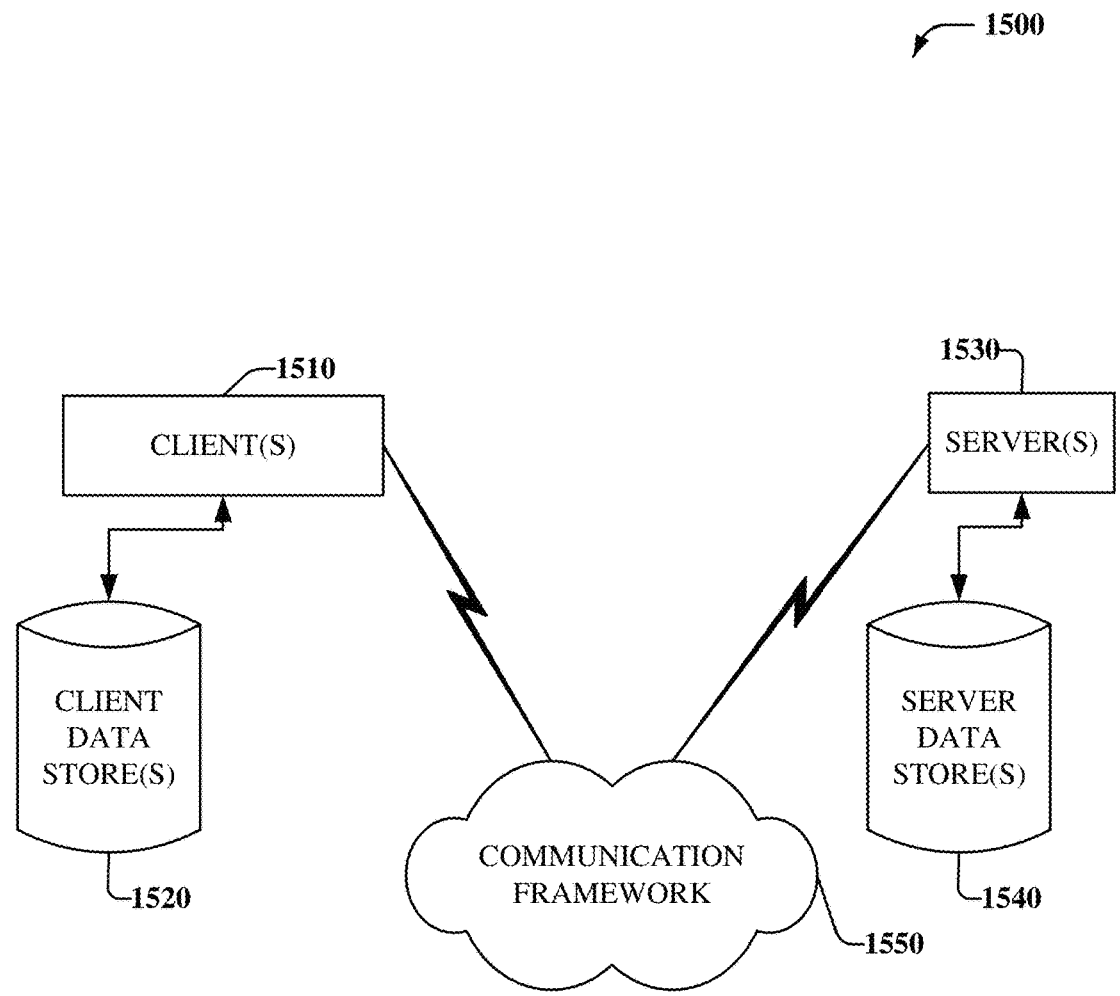
FIG. 15 illustrates an example networking environment operable to execute various implementations described herein.

FIG. 15 is a schematic block diagram of a sample computing environment 1500 with which the disclosed subject matter can interact. The sample computing environment 1500 includes one or more client(s) 1510. The client(s) 1510 can be hardware or software (e.g., threads, processes, computing devices). The sample computing environment 1500 also includes one or more server(s) 1530. The server(s) 1530 can also be hardware or software (e.g., threads, processes, computing devices). The servers 1530 can house threads to perform transformations by employing one or more embodiments as described herein, for example. One possible communication between a client 1510 and a server 1530 can be in the form of a data packet adapted to be transmitted between two or more computer processes. The sample computing environment 1500 includes a communication framework 1550 that can be employed to facilitate communications between the client(s) 1510 and the server(s) 1530. The client(s) 1510 are operably connected to one or more client data store(s) 1520 that can be employed to store information local to the client(s) 1510. Similarly, the server(s) 1530 are operably connected to one or more server data store(s) 1540 that can be employed to store information local to the servers 1530.

The present invention may be a system, a method, an apparatus or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations or block diagrams of methods, apparatus (systems), and computer program products according to embodiments of the invention. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations.

That is, if X employs A; X employs B; or X employs both A and B, then "X employs A or B" is satisfied under any of the foregoing instances. As used herein, the term "and/or" is intended to have the same meaning as "or." Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a processor that executes computer-executable components stored in a non-transitory computer-readable memory, the computer-executable components comprising:
an access component that accesses a three-dimensional medical image;
a parameter component that generates, via execution of a first deep learning neural network, a voxel-wise weight map corresponding to the three-dimensional medical image and a set of projection vectors corresponding to the three-dimensional medical image, wherein the first deep learning neural network is trained in a serial pipeline with a second deep learning neural network that is configured to perform an inferencing task on two-dimensional inputs, such that the set of two-dimensional projection images are tailored to the inferencing task; and
a projection component that generates a set of two-dimensional projection images of the three-dimensional medical image, based on the voxel-wise weight map and the set of projection vectors.

2. The system of claim 1, wherein the computer-executable components further comprise:
a training component that executes the second deep learning neural network on the set of two-dimensional projection images, thereby yielding an inferencing task output.

3. The system of claim 2, wherein the training component updates internal parameters of the first deep learning neural network based on an error between the inferencing task output and a ground-truth annotation corresponding to the three-dimensional medical image, or between the inferencing task output and a projection of the ground-truth annotation.

4. The system of claim 3, wherein the training component updates internal parameters of the second deep learning neural network based on the error.

5. The system of claim 1, wherein the projection component generates the set of two-dimensional projection images by multiplying, in element-wise fashion, the voxel-wise weight map with the three-dimensional medical image, thereby yielding an altered three-dimensional medical image, and by projecting the altered three-dimensional medical image along the set of projection vectors.

6. The system of claim 1, wherein the computer-executable components further comprise:
a display component that renders the set of two-dimensional projection images on an electronic display.

7. The system of claim 1, wherein the set of two-dimensional projection images includes an oblique projection.

8. A computer-implemented method, comprising:
accessing, by a device operatively coupled to a processor, a three-dimensional medical image;
generating, by the device and via execution of a first deep learning neural network, a voxel-wise weight map corresponding to the three-dimensional medical image and a set of projection vectors corresponding to the three-dimensional medical image, wherein the first deep learning neural network is trained in a serial pipeline with a second deep learning neural network that is configured to perform an inferencing task on two-dimensional inputs, such that the set of two-dimensional projection images are tailored to the inferencing task; and
generating, by the device, a set of two-dimensional projection images of the three-dimensional medical image, based on the voxel-wise weight map and the set of projection vectors.

9. The computer-implemented method of claim 8, further comprising:
executing, by the device, the second deep learning neural network on the set of two-dimensional projection images, thereby yielding an inferencing task output.

10. The computer-implemented method of claim 9, further comprising:
updating, by the device, internal parameters of the first deep learning neural network based on an error between the inferencing task output and a ground-truth annotation corresponding to the three-dimensional medical image, or between the inferencing task output and a projection of the ground-truth annotation.

11. The computer-implemented method of claim 10, further comprising:
updating, by the device, internal parameters of the second deep learning neural network based on the error.

12. The computer-implemented method of claim 8, wherein the generating the set of two-dimensional projection images comprises:
multiplying, by the device and in element-wise fashion, the voxel-wise weight map with the three-dimensional medical image, thereby yielding an altered three-dimensional medical image; and
projecting, by the device, the altered three-dimensional medical image along the set of projection vectors.

13. The computer-implemented method of claim 8, further comprising:
rendering, by the device, the set of two-dimensional projection images on an electronic display.

14. The computer-implemented method of claim 8, wherein the set of two-dimensional projection images includes an oblique projection.

15. A computer program product for facilitating interpretable task-specific dimensionality reduction, the computer program product comprising a non-transitory computer-readable memory having program instructions embodied therewith, the program instructions executable by a processor to cause the processor to:
access a voxel array;
execute a first deep learning neural network on the voxel array, thereby yielding a voxel-wise weight map and at least one projection vector, and wherein the first deep learning neural network can be trained in a serial pipeline with a second deep learning neural network that is configured to perform an inferencing task on two-dimensional inputs, such that the at least one projected pixel array is specific to the inferencing task;
multiply, in element-wise fashion, the voxel array by the voxel-wise weight map, thereby yielding an altered voxel array;
project the altered voxel array along the at least one projection vector, thereby yielding at least one projected pixel array; and
render the at least one projected pixel array on an electronic display.

16. The computer program product of claim 15, wherein the program instructions are further executable to cause the processor to:
execute the second deep learning neural network on the at least one projected pixel array, thereby yielding an inferencing task output.

17. The computer program product of claim 16, wherein the program instructions are further executable to cause the processor to:
update internal parameters of the first deep learning neural network based on an error between the inferencing task output and a ground-truth annotation corresponding to the voxel array, or between the inferencing task output and a projection of the ground-truth annotation.

18. The computer program product of claim 17, wherein the program instructions are further executable to cause the processor to:
update internal parameters of the second deep learning neural network based on the error.

19. The computer program product of claim 15, wherein the program instructions are further executable to cause the processor to:
render the at least one projected pixel array on an electronic display.

20. The computer program product of claim 15, wherein the at least one projected pixel array includes an oblique projection.

* * * * *